(12) United States Patent  
Suda et al.

(10) Patent No.: US 7,430,397 B2  
(45) Date of Patent: Sep. 30, 2008

(54) RADIO REPEATER AND RADIO RELAY TRANSMISSION METHOD

(75) Inventors: Hirohito Suda, Yokosuka (JP); Takahiro Asai, Yokosuka (JP); Hiromasa Fujii, Yokosuka (JP); Tetsu Tanaka, Zushi (JP)

(73) Assignee: NTT DoCoMo, Inc., Tokyo (JP)

( * ) Notice: Subject to any disclaimer, the term of this patent is extended or adjusted under 35 U.S.C. 154(b) by 684 days.

(21) Appl. No.: 10/989,249

(22) Filed: Nov. 17, 2004

(65) Prior Publication Data

US 2005/0130587 A1    Jun. 16, 2005

(30) Foreign Application Priority Data

Dec. 5, 2003    (JP)    ............. 2003-407559

(51) Int. Cl.
*H04B 3/36* (2006.01)
*H04B 7/14* (2006.01)

(52) U.S. Cl. ................. 455/7; 455/11.1; 455/23; 455/101; 375/211; 375/267; 375/299; 370/226; 370/315; 343/756; 343/725

(58) Field of Classification Search ........ 455/9, 455/7, 65, 11.1, 13.1, 23, 101; 375/211, 375/214, 267, 299, 349, 350; 370/226, 315; 343/756, 726, 909
See application file for complete search history.

(56) References Cited

U.S. PATENT DOCUMENTS 4,038,662 A * 7/1977 Turner .................. 343/752

5,479,443 A * 12/1995 Kagami et al. ............. 375/211
2001/0038670 A1   11/2001 Whight
2002/0039383 A1 *  4/2002 Zhu et al. .................. 375/214
2003/0174847 A1 *  9/2003 Lane et al. .................. 381/66

FOREIGN PATENT DOCUMENTS

| EP | 0 597 588 A2 | 5/1994 |
| EP | 0 924 887 A2 | 6/1999 |
| JP | 55-26735 | 2/1980 |
| JP | 2001-160794 | 6/2001 |
| WO | WO 99/29051 | 6/1999 |

OTHER PUBLICATIONS

Hiroyuki Hamazumi, et al., "A Study of a Loop Interference Canceller for the Relay Stations in an SFN for Digital Terrestrial Broadcasting", 2000 IEEE, pp. 167-171.

(Continued)

*Primary Examiner*—Matthew Anderson
*Assistant Examiner*—Shaima Q Aminzay
(74) *Attorney, Agent, or Firm*—Oblon, Spivak, McClelland, Maier & Neustadt, P.C.

(57) ABSTRACT

A radio repeater including at least first and second relay systems, each including a reception antenna configured to receive a radio signal, a loop interference suppressor, connected to the reception antenna, configured to suppress a loop interference signal in the received radio signal from said reception antenna, an amplifier configured to amplify the loop interference-suppressed radio signal from the loop interference suppressors, and a transmission antenna having a polarization characteristic, which is orthogonal to a polarization characteristic of said reception antenna, configured to transmit the output of said amplifier.

7 Claims, 11 Drawing Sheets

OTHER PUBLICATIONS

Katsumi Sakai, et al., "Study of Multi-point Repeater System with Multiple Input Multiple Output Method", Technical Report of IEICE, pp. 125-132, date unkmown.

Guo Dao-Sheng, et al., "Anti-Jamming Technologies and Simulation System for Transparent Transponder in Satellite Communication", Journal of PLA University of Science and Technology, vol. 3, No. 1, Feb. 2002, pp. 40-44 (with English Abstract).

* cited by examiner

RADIO REPEATER AND RADIO RELAY TRANSMISSION METHOD

TECHNICAL FIELD

The present invention relates to a radio relaying in a general radio communication system, and in particular, to a radio repeater and a radio relay transmission method suitable for use in a radio relaying in a mobile radio communication system.

BACKGROUND ART

In a conventional radio relay transmission method, a transmitter transmits a radio signal having a vertical polarization, for example, and a radio repeater receives the radio signal transmitted from the transmitter and amplifies the received radio signal to be transmitted as a radio signal having a vertical polarization toward a receiver. Thus the radio repeater amplifies the received radio signal and transmits it as a radio signal having the same polarization as the polarization of the received radio signal. Consequently, the receiver receives the radio signal having the same polarization as the polarization of the radio signal transmitted by the transmitter.

In such a radio repeater, a reception antenna and a transmission antenna thereof have an identical polarization characteristic. Consequently, a radio signal transmitted from the transmission antenna of the radio repeater is received in a loop interference way by the reception antenna of the repeater. A signal which is received in the loop interference way will be hereafter referred to as a loop interference signal. If an amplification gain of the radio repeater is increased when the repeater has a reception frequency equal to a transmission frequency, the presence of the loop interference signal causes an oscillation. This limits an increase in the amplification gain.

A technique which estimates and suppresses a loop interference signal in a radio repeater is proposed, for example, in H. Hamazumi et al, "A study of a ioop interference canceller for the relay stations in an SFN for digital terrestial broadcasting", Global Telecommunications Conference 2000, GLOBECOM '00. IEEE, vol. 1, PR 167-171, 27Nov. 1 Dec. 2000 (hereafter referred to as literature 1). As illustrated in FIG. 1, for example, in a radio repeater equipped with a loop interference suppressor of the prior art, a radio signal received by a vertical polarization reception antenna 1 is fed through a loop interference suppressor 2 to an amplifier 3, and the radio signal amplified by the amplifier 3 is transmitted from a vertical polarization transmission antenna 4. The received radio signal from the reception antenna 1 is input to a loop interference channel estimator 5 where a transmission path characteristic (impulse response) of a transmission path 8 for the loop interference signal from the transmission antenna 4 to the reception antenna 1 is estimated. The estimated transmission path characteristic is set up in an FIR filter (finite impulse response filter) 6 where the transmission characteristic of the loop interference transmission path 8 is convoluted into the received radio signal from the recepetion antenna 1 to produce a replica of the loop interference signal. The replica is subtracted from the received radio signal from the reception antenna 1 in a subtractor 7 before it is input to the amplifier 3.

A multiple radio repeater which uses a composite antenna including a horizontal (or vertical) polarization antenna and a vertical (or horizontal) polarization antenna, one of which is used in receiving a transmitted wave from a mating station while using the other for transmission to a mating station to achieve a coupling between different polarizations which is equal to or greater than 40 dB for separation between the transmitted wave and the received wave is disclosed in Japanese Laid-Open Patent Application (26735/80) (hereafter referred to as literature 2). The reception antenna of this radio repeater has an antenna directivity pattern including a main beam of a narrow width which is chosen to be in the direction of a transmitter antenna.

A multiple input multiple output (MIMO) system in which a plurality of information series are transmitted from a radio transmitter on a common frequency band and the radio signals on the same frequency band are received by a receiver to be separated into respective information series is disclosed in Katsumi Sakai et. al, "Multipoint relay transmission system", The Institute of Electronics, Information and Communication Engineers, Technical Report of IEICE RCS 2001-263 (hereafter referred to as literature 3), which is shown in summary in FIG. 2. A transmitter 10 transmits M information series $S_1, \ldots, S_M$ (where M is an integer equal to or greater than 2) from transmission antennas $A_S 1, \ldots, A_S M$ as radio signals having a vertical polarization on a common frequency band. M radio signals are received by L radio repeaters $20_1, \ldots, 20_L$ (where L is an integer equal to or greater than 1) and are once stored therein. Upon termination of transmission from the transmitter 10 such as one call, one burst or the like, in response to a temporary cease of transmission from the transmitter 10, the radio repeaters $20_1, \ldots, 20_L$ amplify the stored radio signals to form radio signals having a vertical polarization, which are transmitted toward a receiver 30. The receiver 30 include N linear polarization reception antennas Ar1, ..., ArN (where N is an integer equal to or greater than M) which receive the radio signals from the radio repeaters. The received signals are subject to MIMO equalization processing to be separated into M information series $S_1, \ldots, S_M$. If the transmitter 10 and the receiver 30 are located in a line of sight environment, the provision of the radio repeaters 20 allows the channel capacity to be improved by increasing transmission paths through the radio repeaters 20 in addition to linear transmission paths joining between the transmitter 10 and the receiver 30.

DISCLOSURE OF THE INVENTION

Issues to be Solved by the Invention

In a conventional radio repeater, the relaying amplification gain cannot be increased in order to prevent an oscillation from occurring by loop interference signals because the reception antenna and the transmission antenna have an identical polarization characteristic. In addition, in a conventional radio repeater, the directional beam of the reception antenna thereof is directed in the direction of the transmitter antenna, and this presents a difficulty in moving the location of the radio repeater. The separation between different polarizations as disclosed in the cited Japanese Laid-Open Patent Application relates to a communication between opposing stations, and is not suited to a relaying in a communication system such as a mobile communication.

In a conventional radio relay transmission method of MIMO type, for example, in the method illustrated in FIG. 2, even though the number of transmission paths can be increased, the radio repeater once stores received radio signals, and then transmits the stored radio signals while the transmission from the transmitter is interrupted in order to avoid the loop interference problem which occurs at the radio repeater, or the reception and the transmission take place at the radio repeater in a time division manner, resulting in a disadvantages that the amount of signals which can be transmitted is nearly halved in comparison to a continuous relaying operation.

Means to Solve the Issues

With a radio repeater according to the present invention, radio signals are received by a first and a second reception antenna having polarization characteristics which are orthogonalized relative to each other. At least one of loop interference signals from a first and a second transmission antenna is suppressed from a first and a second radio signal which are received by the first and the second reception antenna in a first and a second loop interference suppressor. The loop interference suppressed first and second radio signals are amplified in a first and a second amplifier, respectively, and the amplified first and second radio signals are transmitted by the second and the first transmission antenna which have polarization characteristics orthogonalized relative to the first and the second reception antenna.

According to a radio relaying transmission method according to the present invention, radio signals on a common frequency band are simultaneously transmitted from a transmitter through a plurality of antennas having polarization characteristics which are orthogonalized relative to each other, radio signals having a polarization which correspond to one of the orthogonalized polarizations are received by respective radio repeaters, and the received radio signals are amplified and transmitted on the common frequency band as radio signals having the other of the orthogonalized polarizations.

EFFECTS OF THE INVENTION

With the radio repeater according to the present invention, a received radio signal is transmitted from a transmission antenna having a polarization which is orthogonal to the polarization of the reception antenna to decouple between the transmission and the reception antenna. In addition, at least one of loop interference signals from the first and second transmission antennas having polarizations which are orthogonalized relative to each other is suppressed from the antenna received radio signal, thus reducing a coupling between the transmission and the reception antenna.

With the radio relay transmission method according to the present invention, the use of a radio repeater increases the number of transmission paths from a transmitter to a receiver, and the radio repeater is allowed to perform the reception and transmission simultaneously for the reception antenna and the transmission antenna having polarizations which are orthogonalized, permitting a continuous relaying and amplifying operation to be achieved, thus increasing the channel capacity. There is no need to provide a narrow directivity beam for the reception antenna of the radio repeater, and the radio repeater can be moved.

BEST MODES OF CARRYING OUT THE INVENTION

Before describing the modes of carrying out the radio repeater according to the present invention, a variety of radio repeaters which are used in the implementation of the radio communication method according to the present invention will be shown.

Pressumed Repeater

Figure 3:
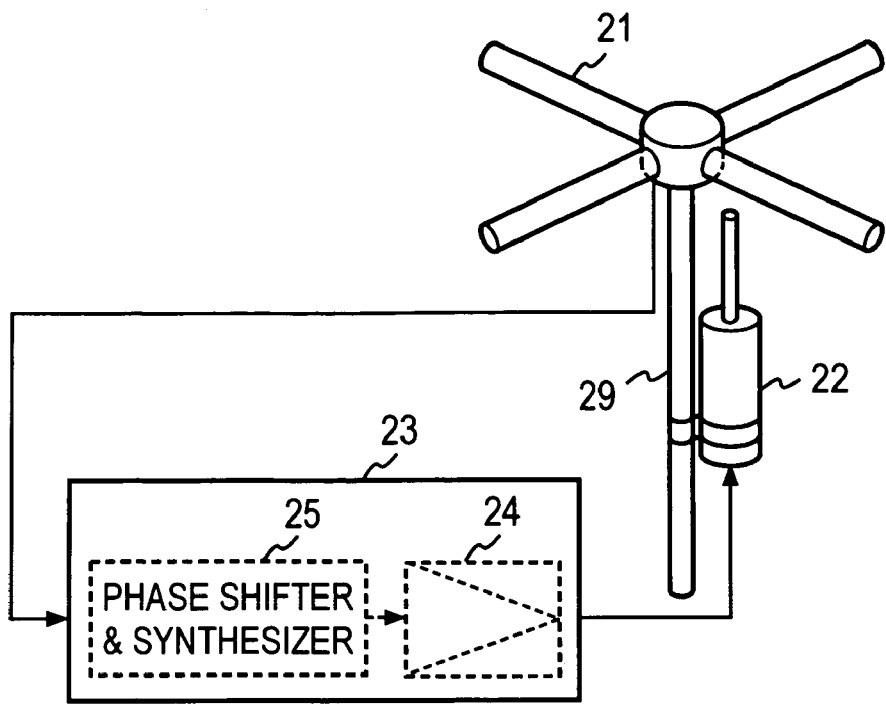
FIG. 3 shows an example of a radio repeater which can be used in the radio relay transmission method according to the present invention.

A repeater which is presumed to have a reception antenna and a transmission antenna having polarizations which are orthogonalized to each other is used. FIG. 3 illustrates the use of a horizontal polarization antenna and a vertical polarization antenna. In the example shown in FIG. 3, a reception antenna 21 comprises a horizontal polarization antenna which is formed by a turnstile antenna disposed in a horizontal plane, and a transmission antenna 22 comprises a vertical polarization antenna formed by a sleeve (dipole) antenna which stands vertically upright. These antennas are mounted on a stanchion 29, with the turnstile antenna 21 located above. The radio signal received by the horizontal polarization reception antenna 21 is amplified by an amplifier 24 disposed within a casing 23, but because a turnstile antenna is used as the reception antenna 21 in this example, one of received signals from two dipole elements have their phase shifted by 90° from each other and then synthesized in a phase shifter and synthesizer 25 before it is input to the amplifier 24. The amplified radio signal is transmitted from the transmission antenna 22.

The radio signal (radio wave) transmitted from the transmission antenna 22 has a vertical polarization, and therefore is not received by the horizontal polarization reception antenna 21. The separation which is based on the orthogonal polarizations or so-called cross polarization distinction is highly enough to suppress loop interference signals in a satisfactory manner, allowing the gain of the relaying amplification to be increased by a corresponding amount in comparison to an arrangement in which the same polarization is used for the reception and transmission. It is to be noted that the both antennas 21 and 22 are non-directional as regard the directivity in the horizontal plane. However, although the directivity of the turnstile antenna 21 in a vertical plane is directed toward the sleeve antenna 22 or downward in this example, the directivity of the sleeve antenna 22 in the vertical plane is null in a direction of the turnstile antenna 21, and it will be seen in this respect that a received signal by the reception antenna 21 is less susceptible to a transmit signal from transmit antenna 22.

It is to be understood that a vertical polarization antenna may be used as the reception antenna 21 while a horizontal polarization antenna may be used as the transmission antenna 22. An alternative choice for the horizontal polarization antenna would be a microstrip antenna which is nearly non-directional in the horizontal plane in the similar manner as the turnstile, and an alternative choice for the vertical polarization antenna would be a mono-pole antenna which is nearly non-directional in the horizontal plane in the similar manner as the sleeve antenna. A radio repeater using a horizontal polarization antenna and a vertical polarization antenna as shown in FIG. 3 will be hereafter referred to as a repeater 1.

Figure 4:
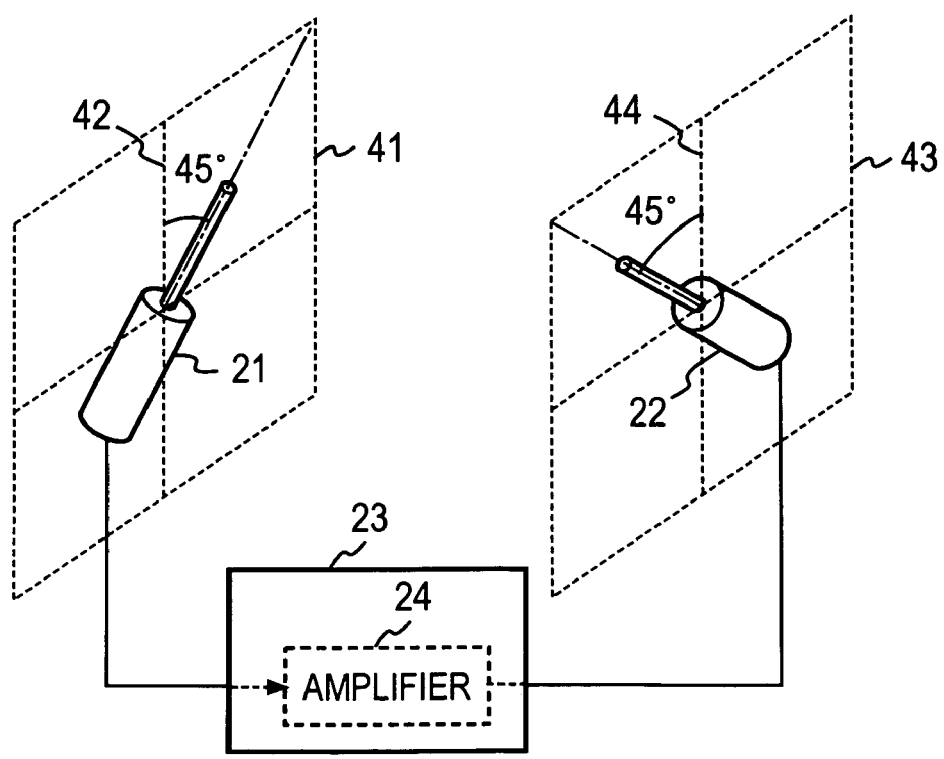
FIG. 4 shows another example of a radio repeater which can be used in the radio relay transmission method according to the present invention.

FIG. 4 shows an example of a repeater 2 which uses a reception antenna and a transmission antenna having circular polarization which are orthogonal to each other. A sleeve (dipole) antenna which is inclined by 45° clockwise with respect to a vertical line 42 disposed within a vertical plane 41 is used as a reception antenna 21. A sleeve (dipole) antenna which is inclined by 45° counter-clockwise from a vertical line 44 disposed within a vertical plane 43 which is parallel to the vertical plane 41 is used as a transmission antenna 22. When the vertical planes 41 and 43 are superimposed upon each other, the polarizations of the reception antenna 21 and the transmission antenna 22 are orthogonal to each other.

Again, the polarization of the radio signal transmitted from the transmission antenna 22 is orthogonal to the polarization of the received radio wave from the reception antenna 21, allowing loop interference signals to be suppressed and thus allowing the relaying amplification gain to be increased. It will be seen that the reception antenna 21 may be inclined counter-clockwise with respect to the vertical line while the transmission antenna 22 may be inclined clockwise with respect to the vertical line. What is required is that an orthogonal relationship be established between the reception antenna 21 and the transmission antenna 22. The sleeve antenna mentioned above may be replaced by a skew polarization antenna such as mono-pole antenna which is non-directional in a plane which is perpendicular to the other polarization.

Figure 5:
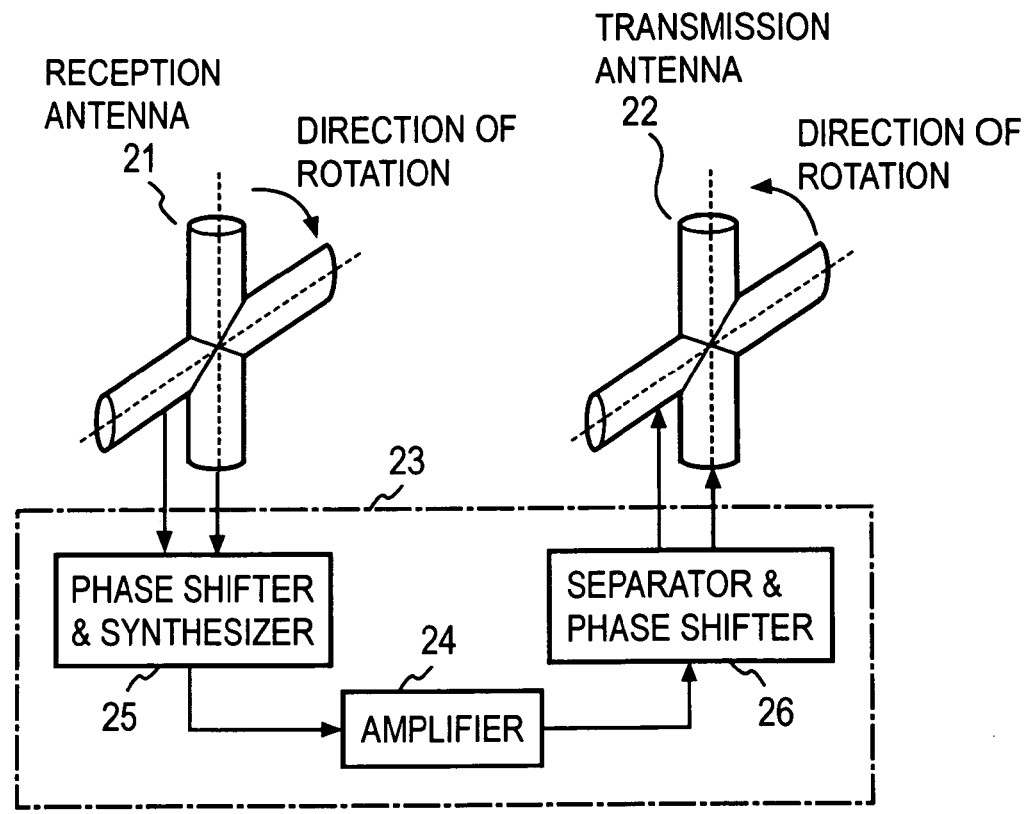
FIG. 5 shows a further example of a radio repeater which can be used in the radio relay transmission method according to the present invention.

FIG. 5 shows an example of a repeater 3 which uses a dextrorotatory circular polarization antenna and a levorotatory circular polarization antenna as antennas having orthogonalized polarization characteristics. A dextrorotatory turnstile antenna which is disposed vertically is used as a reception antenna 21 while a levorotatory turnstile antenna which is disposed vertically is used as the transmission antenna 22, and the both turnstile antennas are disposed exactly opposite to each other. Received radio signals from two elements of the turnstile antenna which defines the reception antenna 21 are fed to a phase shifter and synthesizer 25 to be synthesized so that a signal from the vertical element is lagging by 90° with respect to a signal from the horizontal element before it is fed to the amplifier 24. On the other hand, the amplified radio signal from the amplifier 24 is split into two parts in a splitter and phase shifter 26 and one part is delayed so as to have a phase which is lagging by 90° with respect to the other so that the signal having the lagging phase is fed to the horizontal element and the non-lagging signal is fed to the vertical element of the turnstile antenna which defines the transmission antenna 22.

Since the circular polarization of the radio signal (radio wave) transmitted from the transmission antenna 22 rotates in a direction opposite from the direction of rotation of the polarization of the reception antenna 21, loop interference signals can be suppressed, allowing the relaying amplification gain to be increased by a corresponding amount. The levorotatory circular polarization antenna may be used for the reception antenna 21 while the dextrorotatory circular polarization antenna may be used for the transmission antenna 22. The circular polarization antenna is not limited to the turnstile antenna, but may also comprise cross Yagi antenna, a microstrip antenna and the like.

Modes for carrying out the present invention will be described below with reference to the drawings, but it should be noted that corresponding parts are designated by like reference numerals throughout the drawings in order to omit a duplicated description.

Mode 1

A mode 1 for carrying out a radio repeater according to the present invention comprises U first-polarization reception antennas, V second-polarization reception antenna having a polarization characteristic which is orthogonalized with respect to the polarization characteristic of the first-polarization reception antenna, U second-polarization transmission antennas and V first-polarization transmission antennas which have polarization characteristics orthogonalized to the polarization characteristics of the first-polarization reception antenna and the second-polarization reception antenna, respectively, where U and V are integers equal to or greater than 1.

Figure 6:
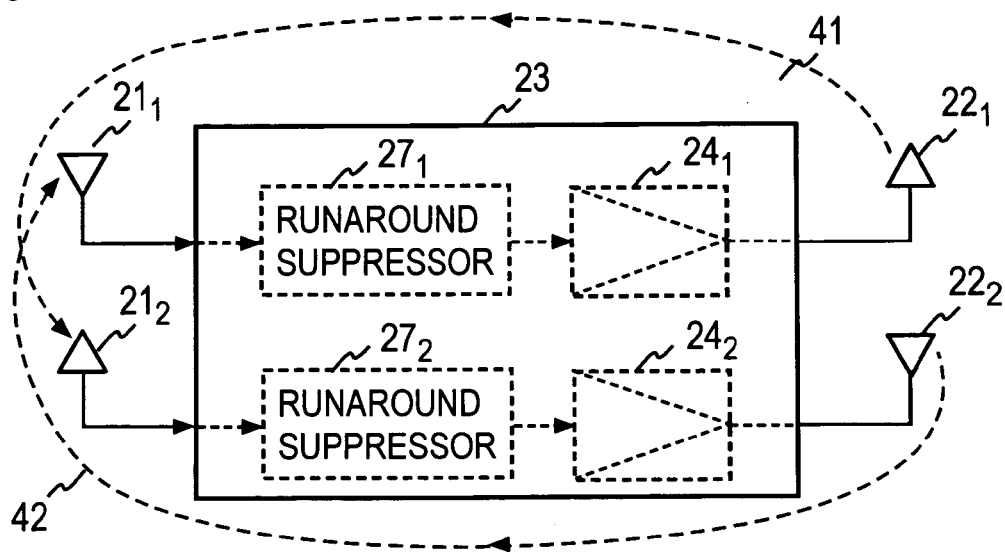
FIG. 6 shows a functional arrangement of an exemplary radio repeater according to the present invention.

FIG. 6 shows an embodiment in which U=V=1. Two antennas having the polarization characteristics orthognalized to each other may comprise one of the pairs illustrated in FIGS. 3 to 5. In the description to follow, one of the two antennas having polarization characteristics which are orthogonalized to each other is indicated by a triangle (inverted triangle) having its apex at its bottom which is connected to a vertical line while the other is indicated by a triangle disposed on a vertical line and having its apex disposed at the top.

The radio repeater comprises a first-polarization reception antenna $21_1$ and a second-polarization reception antenna $21_2$, and radio signals received by the first and the second-polarization reception antenna $21_1$ and $21_2$ are fed to loop interference suppressors $27_1$ and $27_2$, respectively, where loop interference signals are suppressed before the radio signals are fed to amplifiers $24_1$ and $24_2$. The radio signals which are amplified by the amplifiers $24_1$ and $24_2$ and in which the loop interference signals are suppressed are transmitted from a second-polarization and a first-polarization transmission antenna $22_1$ and $22_2$, respectively. The loop interference suppressors $27_1$ and $27_2$ may comprise the suppressors disclosed in the literature 1, for example.

With the described arrangement, the radio signal (radio wave) transmitted from the second-polarization transmission antenna $22_1$ has a polarization which is orhtogonalized to the polarization characteristic of the first reception antenna $21_1$, and is little received as a loop interference signal by the first-polarization reception antenna $21_1$, but has the same polarization as the second-polarization reception antenna $21_2$, and thus a loop interference signal is received by the second-polarization reception antenna $21_2$. This loop interference signal is suppressed by the loop interference suppressor $27_2$ before it is fed to the amplifier $24_2$, whereby an oscillation which may be caused by the loop interference signal can be prevented while allowing the gain of the amplifier $24_2$ to be increased. Similarly, a loop interference signal from the radio signal which is transmitted from the first-polarization transmission antenna $22_2$ is received by the first-polarization reception antenna $21_1$, but is suppressed by the loop interference suppressor $27_1$, again allowing the gain of the amplifier $24_1$ to be increased.

Figure 2:
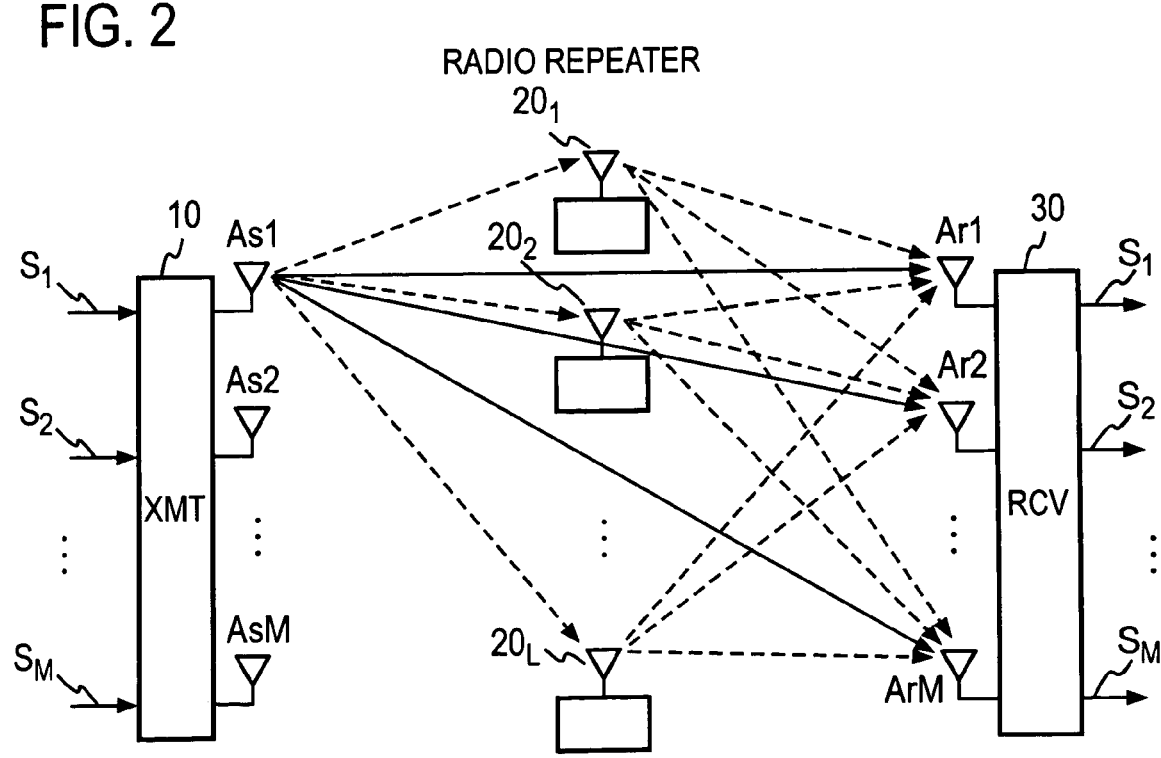
FIG. 2 illustrates a multi-point relay transmission system according to a conventional MIMO system.

In this manner, a plurality of radio signals on a common frequency band and having polarizations which are orthogonalized to each other can be simultaneously relayed and amplified with a relatively high gain, thus allowing the channel capacity which can be relayed by the radio repeater shown in FIG. 2 to be increased.

EMBODIMENT 1

The likelihood of an oscillation occurring in the repeater shown in FIG. 6 arises from the following reason: for example, a radio signal received by the first-polarization reception antenna $21_1$ is transmitted from the second-polarization transmission antenna $22_1$ and this radio signal is received by the second-polarization reception antenna $21_2$ through a loop interference transmission path 41. The received loop interference signal is amplified by the amplifier $24_2$ to be transmitted from the first-polarization transmission antenna $22_2$, and the transmitted loop interference signal is received by the first-polarization reception antenna $21_1$ through a loop interference transmission path 42, and the received loop interference signal is amplified by the amplifier $24_1$ to be transmitted again from the second-polarization transmission antenna $22_1$. Thus, there arises the likelihood that the loop interference signal may circulate through the following closed path:

transmission antenna $22_1$-transmission path 41-reception antenna $21_2$-amplifier $24_2$-transmission antenna $22_2$-transmisison path 42-reception antenna $21_1$-amplifier $24_1$-transmission antenna $22_1$, thus causing an oscillation.

Figure 1:
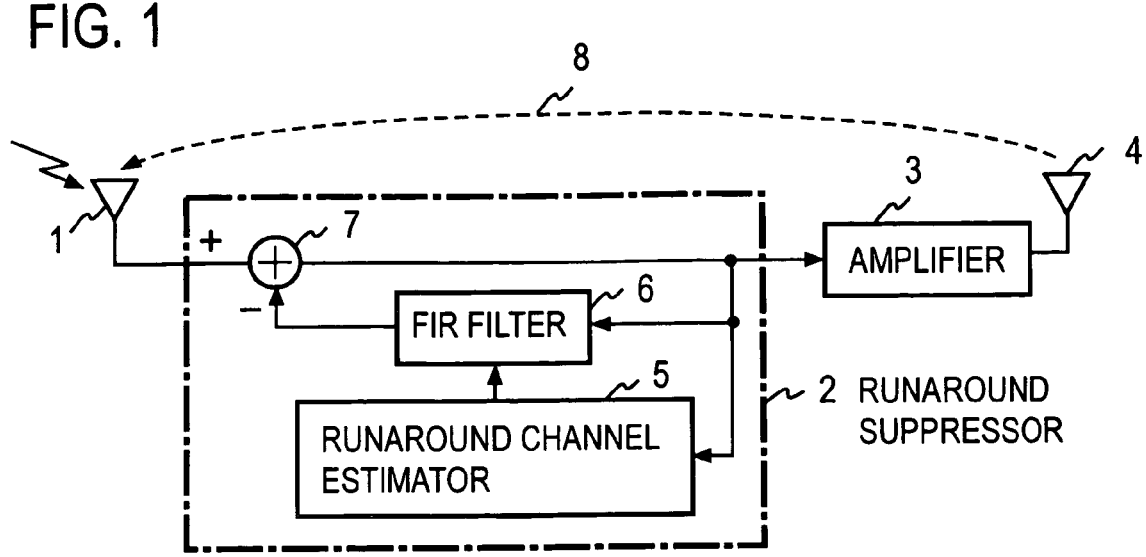
FIG. 1 is a functional illustration of an exemplary radio repeater of the prior art including a loop interference suppressor.

If one becomes aware of such a complicated cross loop interference and think of suppressing a loop interference signal in the similar manner as is done by the loop interference suppressor $27_1$ of the prior art shown in FIG. 1, it follows that the loop interference suppressor $27_1$ will suppress the loop interference signal which is amplified by the amplifier $24_1$ and also by the amplifier $24_2$. However, because noises are added into the signal each time it is amplified by an amplifier, it is seen that the loop interference suppressor $27_1$ will have to suppress the loop interference signal which has passed through two amplifiers. Accordingly, a loop interference signal which results from the radio signal received by the first-polarization reception antenna $21_1$ has noises added thereto when it has passed the amplifier $24_2$, and this means that an output signal from the loop interference suppressor $27_1$ has noises added thereto. The likelihood of an oscillation occurring as a result of the loop interference signal which results from a radio signal received by the second-polarization reception antenna $21_2$ is based on the circulation through the closed path mentioned above, the only difference being that the closed path is entered at the first-polarization transmission antenna $22_2$. A preferred example for the loop interference suppressors $27_1$ and $27_2$ which takes this into consideration will now be described with reference to FIG. 7.

Assuming that a radio signal received by the second-polarization reception antenna $21_2$ is transmitted from the first-polarization transmission antenna $22_2$, in the present embodiment, when the transmitted signal is received by the first-polarization reception antenna $21_1$ as a loop interference signal, this loop interference signal is suppressed. In other words, when the loop interference signal enters the closed loop, it is suppressed before it passes through the second amplifier. At this end, a transmission path characteristic (an impulse response which may be referred to as a channel characteristic) of a loop interference transmission path 42 which is followed by a signal transmitted from the first-polarization transmission antenna $22_2$ and received by the first-polarization reception antenna $21_1$ is estimated by a loop interference channel estimator $43_1$. Thus, the loop interference channel estimator $43_1$ estimates the transmission path characteristic of the loop interference transmission path 42 to another relay system. An own relay system refers to a relay system in which a radio signal received by the first-polarization reception antenna $21_1$, for example, is amplified by the amplifier $24_1$ and then transmitted from the second-polarization transmission antenna $22_1$.

While various techniques may be contemplated to estimate the loop interference transmission characteristic to another relay system, as an example, a pilot signal may be developed by a pilot generator $44_1$ to be fed to an amplifier $24_2$ which amplifies it, and the transmission path characteristic of the loop interference transmission path 42 is estimated on the basis of the pilot signal and a loop interference signal which results from the transmission from the first-polarization transmission antenna $22_2$ and which is received by the first-polarization reception antenna $21_1$ through the loop interference transmission path 42 during the time a radio signal to be received is temporarily interrupted, for example. Alternatively, the estimation of the channel characteristic can be made without waiting for a time interval when a received radio signal is interrupted by using a pilot signal which is slightly offset from the band of a received radio signal.

The signal received by the second-polarization reception antenna $21_2$ or the input signal to the amplifier $24_2$ is convoluted in an FIR filter $45_1$ with the characteristic of the loop interference transmission path 42 which is estimated by the loop interference channel estimator $43_1$, thus producing a replica of the loop interference signal coming on the loop interference transmission path 42. The loop interference signal replica is subtracted in a subtractor $46_1$ from the radio signal received by the first-polarization reception antenna $21_1$, and an output signal from the subtractor $46_1$ is input to the amplifier $24_1$.

In this manner, the loop interference signal which results from the radio signal received by the second-polarization reception antenna $21_2$ that passes through the loop interference transmission path 42 to be received by the first-polarization reception antenna 21$_1$ and which is contained in the radio signal received by the first-polarization reception antenna 21$_1$ is suppressed by using the loop interference signal replica fed from the FIR filter 45$_1$. Thus, this loop interference signal which results from the radio signal received by the second-polarization reception antenna 21$_2$ and which passes through the loop interference transmission path 42 from the first-polarization transmission antenna 22 is suppressed at the point it is input to the closed path, avoiding a problem that the loop interference signal is amplified by the amplifier 24$_1$ to add noises.

The loop interference suppressor 27$_2$ also comprises a loop interference channel estimator 43$_2$ which estimates the characteristic of a loop interference transmission path 41, an FIR filter 45$_2$ which convolutes the estimated transmission path characteristic with the radio signal received by the first-polarization reception antenna 21$_1$, and a subtractor 46$_2$ which subtracts a loop interference signal replica produced by the FIR filter 45$_2$ from the radio signal received by the second-polarization reception antenna 21$_2$ before it is input to the amplifier 24$_2$ in the similar manner as the loop interference suppressor 27$_1$. As a consequence, it is possible to suppress the radio signal received by the first-polarization reception antenna 21$_1$ from being input to the closed path through the loop interference transmission path 41 at the entrance to the closed path. It is to be understood that the estimation of the loop interference transmission paths 42 and 41 by the loop interference channel estimators 43$_1$ and 43$_2$ take place one after another. Alternatively, the transmission path characteristic of the closed loop for the loop interference signal may be estimated and the radio signal received by the first-polarization reception antenna 21$_1$, for example, may be convoluted with the estimated transmission path characteristic to produce a replica of the loop interference signal, and the replica may be subtracted from the radio signal received by the first-polarization reception antenna 21$_1$ before it is fed to the amplifier 24$_1$.

Mode 2

A mode of carrying out the radio relay transmission method according to the present invention will now be described.

SYSTEM EXAMPLE 1

Figure 8:
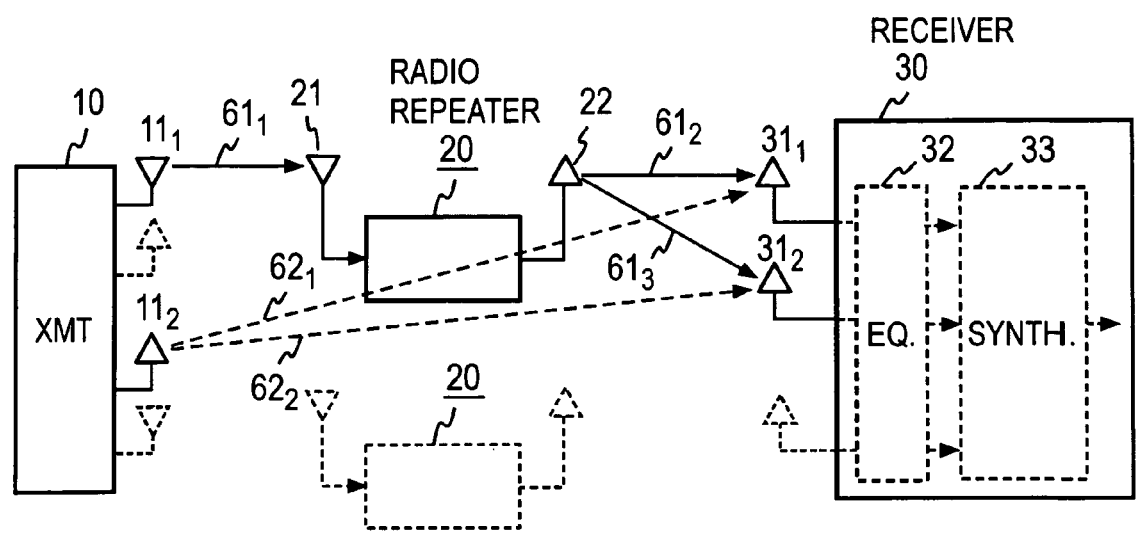
FIG. 8 shows an exemplary arrangement of a radio relay transmission system which is capable of applying the radio relay transmission method according to the present invention.

An exemplary arrangement of a communication system to which the mode 2 can be applied is schematically shown in FIG. 8. A transmitter 10 is provided with a first-polarization and a second-polarization transmission antenna 11$_1$ and 11$_2$ having polarizations which are orthogonalized. Radio signals on a common frequency band are simultaneously transmitted from the first-polarization and the second-polarization transmission antenna 11$_1$ and 11$_2$. Information series S$_1$ and S$_2$ which are transmitted as radio signals from the first-polarization and the second-polarization transmission antenna 11$_1$ and 11$_2$, may be similar or dissimilar.

A radio repeater 20 is provided with a first-polarization reception antenna 21 having the same polarization characteristic of one of the first-polarization and the second-polarization antenna 11$_1$ and 11$_2$ which is the polarization characteristic of the transmission antenna 11$_1$ in the example shown, and with a second-polarization transmission antenna 22 having a polarization characteristic which is orthogonalized to the polarization characteristic of the first-polarization reception antenna 21. In other words, the radio repeater 20 used may be one of the radio repeaters described previously with reference to FIGS. 3 to 5. The type of the polarization used in orthogonalizing the polarization characteristics of the first-polarization reception antenna 21 and the second-polarization transmission antenna 22 of the radio repeater 20 is similar to the type of the polarization used in the transmission antennas 11$_1$ and 11$_2$, namely, either one of dextrorotatory and levorotatary polarizations, linear polarizations both, circular polarizations both or circular polarization both.

A radio signal from the first-polarization transmission antenna 11$_1$ is received by the first-polarization reception antenna 21, and the received radio signal is amplified to be transmitted from the second-polarization transmission antenna 22 as a radio signal having a polarization which is orthogonalized to the polarization of the received radio signal.

A receiver 30 is provided with two reception antennas 31$_1$ and 31$_2$ having the same polarization characteristic as the transmission antenna 22 of the radio repeater 20 inclusive of the type of orthogonalization, or having the second-polarization in this example.

In the receiver 30, a radio signal transmitted from the second-polarization transmission antenna 11$_2$ of the transmitter 10 and a radio signal transmitted from the radio repeater 20 are received by the second-polarization reception antennas 31$_1$ and 31$_2$.

The radio signal transmitted from the first-polarization transmission antenna 11$_1$ of the transmitter 10 is relayed and amplified by the radio repeater 20 and has its polarization changed into an orthogonalized manner to be received by the two second-polarization reception antennas 31$_1$ and 31$_2$ of the receiver 30, as indicated by solid lines 61$_1$, 61$_2$ and 61$_3$. Specifically, the radio signal from the first-polarization transmission antenna 11$_1$ is received by the receiver 30 as signals passing through two propagation paths. The radio signal transmitted from the second-polarization transmission antenna 11$_2$ is received by the two second-polarization reception antennas 31$_1$ and 31$_2$ of the receiver 30 without being relayed by the radio repeater 20, as indicated by broken lines 62$_1$ and 62$_2$, again passing through two propagation paths.

In this manner, the signals received by the receiver 30 pass through mutually different propagation paths. Because these propagation paths have different propagation characteristics (impulse responses), the radio signals received by the both antennas 31$_1$ and 31$_2$ of the receiver 30 are subject to an equalization and separation processing in an equalizer 32, whereby the information series which are transmitted from the transmission antennas 11$_1$ and 11$_2$ of the transmitter 10 are delivered in separated form. The equalizer 32 may perform a separation processing which is similar to a signal separation processing in the MIMO (Multiple Input Multiple Output) system disclosed in the literature 3. Where the information series transmitted from the transmission antennas 11$_1$ and 11$_2$ are identical, the both information series which are separated in the equalizer 32 are added together into a single information series in a synthesizer 33.

Since the reception antenna 21 and the transmission antenna 22 of the radio repeater 20 have polarization characteristics which are orthogonalized to each other, the reception and the transmission can take place simultaneously and continuously, and the provision of the radio repeater 20 increases the number of propagation paths, allowing the channel capacity to be increased. As indicated in dotted lines in FIG. 8, the transmitter 10 may have a plurality of first-polarization transmission antennas 11$_1$ and also a plurality of second-polarization transmission antennas 11$_2$. Also, a plurality of radio repeaters 20 may be provided, and three or more second-polarization antennas may be provided with the receiver 30.

SYSTEM EXAMPLE 2

Figure 9:
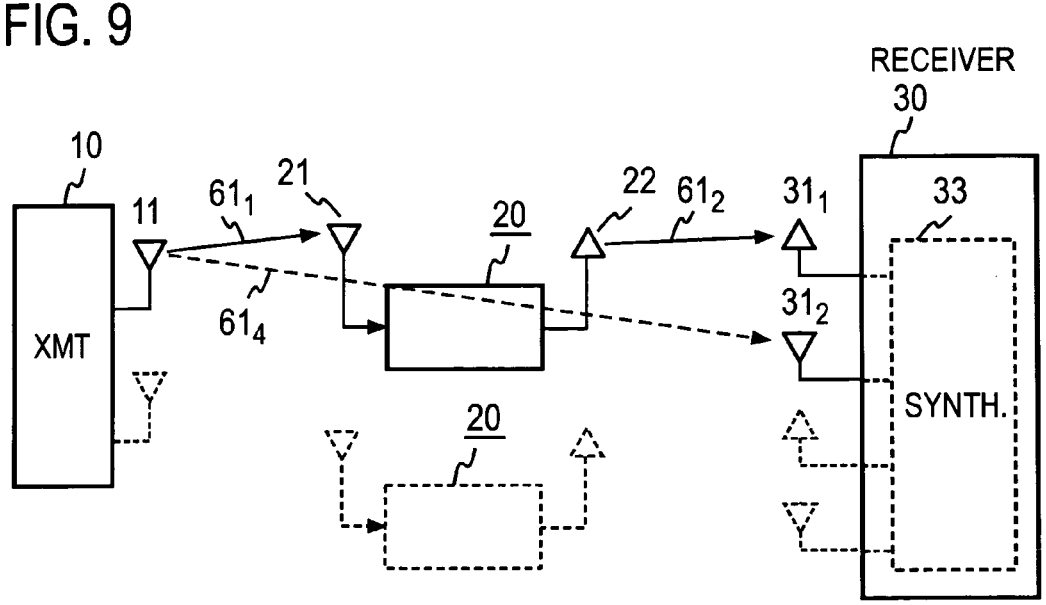
FIG. 9 shows another arrangement of a radio relay transmission system which is capable of applying the radio relay transmission method according to the present invention.

A system arrangement to which the radio relay transmission method according to the present invention can be applied will be described with reference to FIG. 9 which illustrates the system arrangement in a simplified form.

A radio signal is transmitted from a first-polarization transmission antenna 11 of a transmitter 10 and is received by a first-polarization reception antenna 21 of a radio repeater 20 which has the same polarization characteristic as the first-polarization transmission antenna 11. The received radio signal is amplified and is transmitted from a second-polarization transmission antenna 22 having a polarization characteristic which is orthogonalized to the reception antenna 21 or is transmitted as a radio signal having a polarization which is orthogonalized to the polarization of the received radio signal. In a receiver 30, the radio signal is received by a second-polarization reception antenna $31_1$ having the polarization characteristic which is identical with that of the second-polarization antenna 22 of the radio repeater 20 and by a first-polarization reception antenna $31_2$ having a polarization characteristic which is orthogonalized to that of the second-polarization antenna 22.

The radio signal transmitted from the first-polarization transmission antenna 11 of the transmitter 10 is relayed and amplified by the radio repeater 20 to be received by the second-polarization reception antenna $31_1$ of the receiver 30, as indicated by solid lines $61_1$ and $61_2$ and is also received by the first-polarization reception antenna $31_2$ of the receiver 30 without being relayed by the radio repeater 20, as shown by broken lines $61_4$.

Signals received by the both reception antennas $31_1$ and $31_2$ of the receiver 30 are synthesized in a synthesizer 33. Since the propagation paths of the signals received by the reception antennas $31_1$ and $31_2$ have different characteristics or since the number of propagation paths is increased and the radio repeater 20 orthogonalizes the polarization of the received signal for transmission on the common frequency band, the reception and the transmission can take place simultaneously and continuously, allowing the channel capacity to be increased. As indicated in dotted lines in FIG. 9, the transmitter 10 may have a plurality of first-polarization transmission antennas 11, a plurality of radio repeaters 20 may be provided, and the receiver 30 may have a plurality of second-polarization reception antennas $31_1$. Similarly, there may be provided a plurality of first-polarization reception antennas $31_2$.

SYSTEM EXAMPLE 3

A simplified arrangement of a system example to which the method according to the present invention is applicable will be described with reference to FIG. 10. A transmitter 10 transmits independent (or different) information series or identical information series simultaneously from a first-polarization transmission antenna $11_1$ and a second-polarization transmission antenna $11_2$ having polarization characteristics which are orthogonalized to each other.

A radio repeater 20 includes a first-polarization reception antenna 21 which receives a radio signal. The received radio signal is transmitted from a second-polarization transmission antenna 22 as a radio signal having a polarization which is orthogonalized with respect to the received signal. A receiver 30 receives the radio signal by a second-polarization reception antenna $31_1$ and also receives a radio signal by a first-polarization reception antenna $31_2$.

Figure 10:
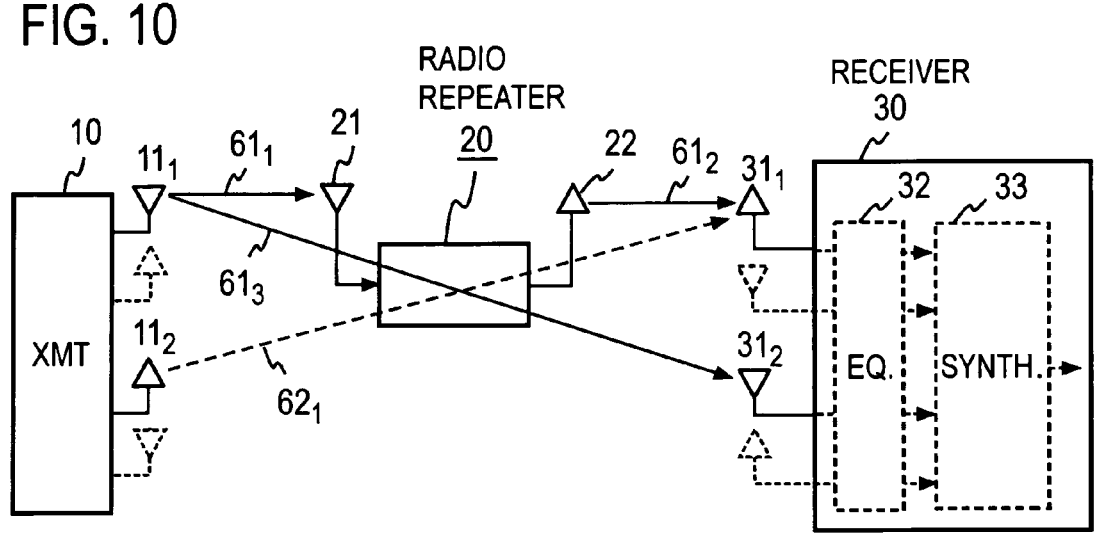
FIG. 10 shows an arrangement of a further radio relay transmission system which is capable of applying the radio relay transmission method according to the present invention.

Considering a radio signal transmitted form the first-polarization antenna $11_1$ of the transmitter 10, it will be seen that there are two propagation paths having mutually different propagation characteristics including propagation path as indicated by solid lines $61_1$ and $61_2$ in FIG. 10 through which the radio signal is relayed by the radio repeater 30 and received by the second-polarization reception antenna $31_1$ of the receiver 30 and propagation path, as indicated by solid lines $61_3$, through which the radio signal is received by the first-polarization reception antennas $31_2$ without being relayed by the radio repeater 20. Considering a radio signal transmitted from the second-polarization antenna $11_2$ of the transmitter 10, it is received by the second-polarization reception antennas $31_1$, of the receiver 30 without being relayed by the radio repeater 20 as indicated by broken lines $62_1$. In the receiver 30, the signals received by two reception antennas $31_1$ and $31_2$ are processed by the equalizer 32 in accordance with the equalization and signal separation technique according to MIMO system to be separated into information series which are transmitted from the transmission antennas $11_1$ and $11_2$ of the transmitter 10. In this manner, the channel capacity can be increased by an increase in the number of propagation paths and a simultaneous reception and transmission by the radio repeater 20. Again, the transmitter 10 may have a plurality of first-polarization transmission antennas $11_1$ or a plurality of second-polarization transmission antennas $11_2$, and similarly, the receiver 30 may have a plurality of first-polarization reception antennas $31_2$ or a plurality of second-polarization reception antennas $31_1$.

EMBODIMENT 2

An embodiment 2 of the method according to the present invention will now be described with reference to a system arrangement shown in FIG. 11. A transmitter 10 simultaneously transmits independent or identical information series on a common frequency band from a first-polarization transmission antenna $11_1$ and a second-polarization transmission antenna $11_2$ having polarization characteristics which are orthogonalized to each other.

In a radio repeater 20, a first-polarization reception antenna $21_1$ and a second-polarization reception antenna $21_2$ receive radio signals. The signal received by the reception antenna $21_1$ has its loop interference signal suppressed in a loop interference suppressor $27_1$ and then amplified by an amplifier $24_1$ to be transmitted as an radio signal having a polarization which is orthogonalized with respect to the received signal from a second-polarization transmission antenna $22_1$. A received signal from a second-polarization reception antenna $21_2$ has its loop interference signal suppressed by a loop interference suppressor $27_2$ and then amplified by an amplifier $24_2$ to be transmitted as a radio signal having a polarization which is orthogonalized with resepect to the received signal from a first-polarization transmission antenna $21_2$. In other words, the radio repeater 20 is similar to that shown in FIG. 6 or 7.

In a receiver 30, second-polarization reception antennas $31_1$ and $31_3$ receive radio signals while first-polarization reception antennas $31_2$ and $31_4$ receive radio signals. Considering the radio signal transmitted from the first-polarization antenna $11_1$ of the transmitter 10, there are four propagation paths having mutually different propagation characteristics including two propagation paths, as indicated by solid lines $61_1$ and $61_2$, $61_3$ in FIG. 11, through which the radio signal is relayed by the radio repeater 20 and received by two second-polarization reception antennas $31_1$ and $31_3$ of the receiver 30, and two propagation paths, as indicated by solid lines $61_4$ and $61_5$, through which the radio signal is received by the first-polarization reception antennas $31_2$ and $31_4$ without being relayed by the radio repeater 20. Similarly, considering a radio signal transmitted from the second-polarization antenna $11_2$ of the transmitter 10, there are four propagation paths having mutually different characteristics including two propagation paths as indicated by broken lines $62_3$ and $62_4$, $62_5$, through which the radio signal is relayed by the radio repeater 20 and received by the first-polarization reception antennas $31_2$ and $31_4$ of the receiver 30, and two propagation paths as indicated by broken lines $62_1$ and $62_2$ through which the radio signal is received by the second-polarization reception antennas $31_1$ and $31_3$ without being relayed by the radio repeater 20. In the receiver 30, the received signals from the four reception antennas $31_1$ to $31_4$ are processed in an equalizer 32 in accordance with the equalization and signal separation technique according to MIMO system to be separated into two information series which have been transmitted from the transmission antennas $11_1$ and $11_2$ of the transmitter 10. In the radio repeater 20, the radio signals received by the first-polarization reception antenna $21_1$ and the second-polarization reception antenna $21_2$ are amplified and are transmitted as radio signals having polarizations which are orthogonalized with respect to the respective received radio signal, thus allowing the reception and the transmission to take place simultaneously and continuously. The channel capacity can be increased by increasing the number of propagation paths and simultaneously performing the reception and the transmission by the radio repeater 20.

Figure 11:
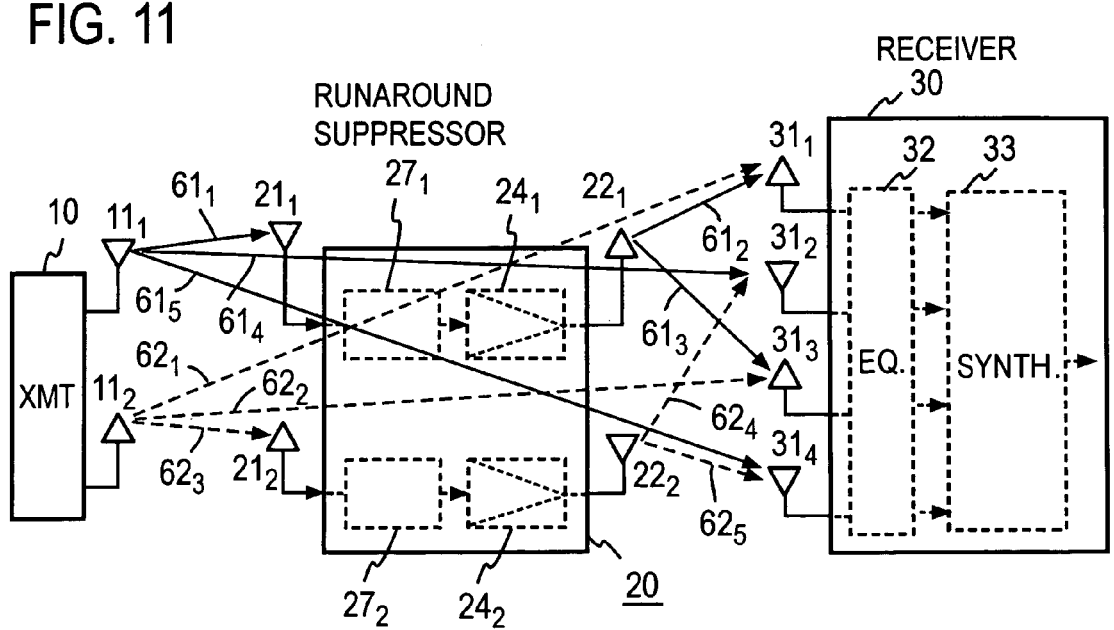
FIG. 11 shows an exemplary arrangement of a radio relay transmission system to which an embodiment of the radio relay transmission method according to the present invention is applied.
Figure 12:
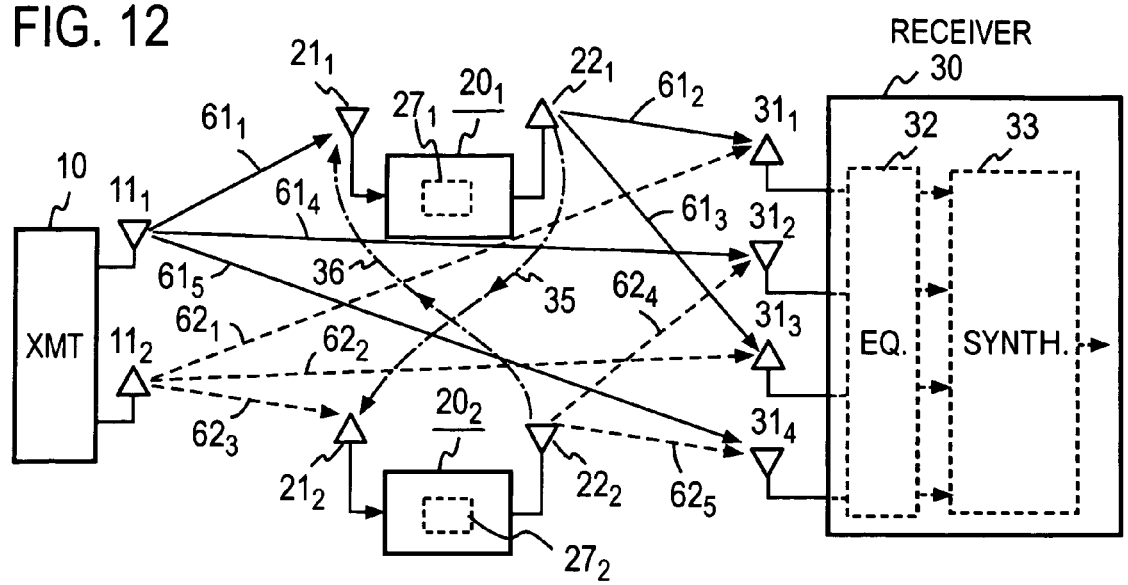
FIG. 12 shows a modification of the system shown in FIG. 11.

As shown in FIG. 12 where corresponding parts are designated by like reference numerals as in FIG. 11, the radio repeater 20 may comprise a radio repeater 20, having a first-polarization reception antenna $21_1$ and a second-polarization transmission antenna $22_1$, and a radio repeater $20_2$ having a second-polarization reception antenna $21_2$ and a first-polarization transmission antenna $22_2$ in a separated form. In this instance, the coupling between the second-polarization transmission antenna $22_1$ and the second-polarization reception antenna $21_2$ as well as the coupling between the first-polarization transmission antenna $22_2$ and the first-polarization reception antenna $21_1$ are less than in the arrangement shown in FIG. 11, and accordingly, loop interference suppressors $27_1$ and $27_2$ disposed within the radio repeaters $20_1$ and $20_2$ may be omitted. When identical information series are transmitted from the transmission antennas $11_1$ and $11_2$ of the transmitter 10, two information series which are separated in the receiver 30 are added together to be synthesized in a synthesizer 33. The reception antennas of the receiver 30 may comprise only the second-polarization reception antenna $31_1$ and the first-polarization reception antenna $31_2$.

Figure 13:
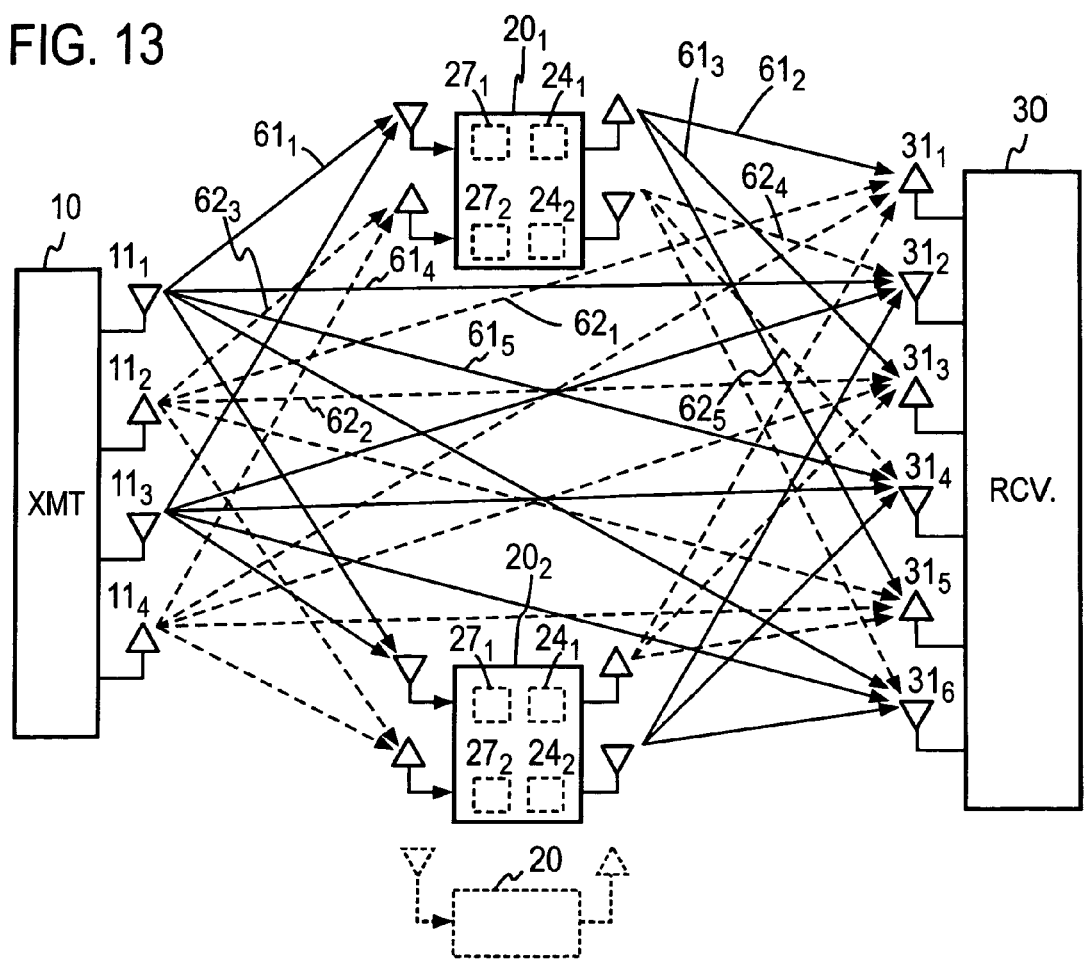
FIG. 13 shows an exemplary system arrangement for the application of the present invention to an MIMO relay transmission method.

The transmitter 10 may have a number of first-polarization transmission antennas equal to Ma (where Ma is an integer equal to or greater than 1) and a number of second-polarization transmission antennas equal to Mb (where Mb is an integer equal to or greater than 1, preferably, $|Ma-Mb| \leq 1$), there may be provided a number of radio repeaters each having a first-polarization reception antenna and a second-polarization transmission antenna equal to La (where La is an integer equal to or greater than 1) and a number of radio repeaters each having a second-polarization reception antenna and a first-polarization transmission antenna equal to Lb (where Lb is an integer equal to or greater than 1, preferably $|La-Lb| \leq 1$), and the receiver 30 may have a number of first-polarization reception antennas equal to Na (where Na is an integer equal to or greater than 1, preferably from 2 to 4 and more preferably $Na \geq Ma$) and a number of second-polarization reception antennas equal to Nb (where Nb is an integer equal to or greater than 1, preferably $Nb \geq Mb$). By way of example, an arrangement in which Ma=Mb=2, Na=Nb=3 and La=Lb=2, that is, two sets of radio repeaters (radio repeater 20 shown in FIG. 11) each having two sets of sets of reception antennas and transmission antennas is shown in FIG. 13. It is to be understood that when counting La and Lb, a set of one reception antenna and one transmission antenna is counted as one radio repeater.

In the radio repeater system shown in FIG. 13 and a radio repeater system in which La, Lb, Ma, Mb, Na and Nb are generalized, the radio repeater 20 may comprise one set of reception antenna and transmission antenna having polarization characteristics which are orthogonalized to each other or the radio repeater shown in FIG. 12. Alternatively, a radio repeater having one set of reception antenna and transmission antenna having polarization characteristics which are orthogonalized to each other and a radio repeater having a plurality of such sets may be dispersed, as indicated in dotted lines in FIG. 13. In addition, the transmitter 10 may be divided and separated into a plurality of divisions while the radio repeater 20 may be consolidated into one. The receiver 30 may also be divided and separated into a plurality of divisions. In this instance, it is generally desirable that the receiver 30 has two to four sets of first-polarization reception antennas and second-polarization reception antennas and the equalizer 32 which performs a signal equalization and separation is only required to separate one or a plurality of signals which are demanded for the receiver 30.

Mode 3

Mode 3 represents a mode of carrying out a radio repeater according to the present invention.

In the radio repeater shown in FIG. 12 and in the system shown in FIG. 13, where a set of reception antenna and transmission antenna exists in one or a plurality of radio repeaters, in the presence of a reflected wave, there is a likelihood of an oscillation occurring in the radio repeater if the orthogonality of polarizations between a received radio signal (radio wave) from one of the radio repeaters and another radio signal (radio wave) which is transmitted from the same radio repeater and is then reflected is changed in the course of the reflection, giving rise to the occurrence of the reflected radio signal (radio wave) which is received by the same repeater again. In addition, there is a likelihood of an oscillation occurring through a closed path which is similar to that described above in connection with FIG. 6 if the radio repeaters $20_1$ and $20_2$ are remotely located in that a radio signal transmitted from a second-polarization transmission antenna $11_2$ of the transmitter 10 is received by a second-polarization reception antenna $21_1$ of the radio repeater $20_1$ and a received radio signal is amplified to be transmitted from a first-polarization transmission antenna $22_1$, and the transmitted radio signal is received by a first-polarization reception antenna $21_2$ of the radio repeater $20_2$ through a loop interference transmission path 35 shown in single dot chain lines shown in FIG. 12, the received loop interference signal being amplified to be transmitted from a second-polarization transmission antenna $22_2$ and a transmitted loop interference signal being received by the second-polarization reception antenna $21_1$ of the repeater $20_1$, and then amplified to be transmitted from the first-polarization transmission antenna $22_1$.

In order to prevent the occurrence of an oscillation which results from an reflected wave or which involves different radio repeater, a conventional loop interference suppressor 2 shown in FIG. 1 can be used in a radio repeater having a set of reception antenna and transmission antenna as shown in FIG. 12 or 13. In this instance, when a loop interference signal which involves a radio repeater will be received with a considerable length of time delay as compared with a loop interference signal which does not pass through a radio repeater by a common reception antenna, in particular when a relaying operation within the repeater is complicated. For this reason, an FIR filter which is used to produce a replica of the loop interference signal will have an increased number of taps. An embodiment of the radio repeater according to the present invention which solves this problem will now be described below.

EMBODIMENT 3

Figure 14:
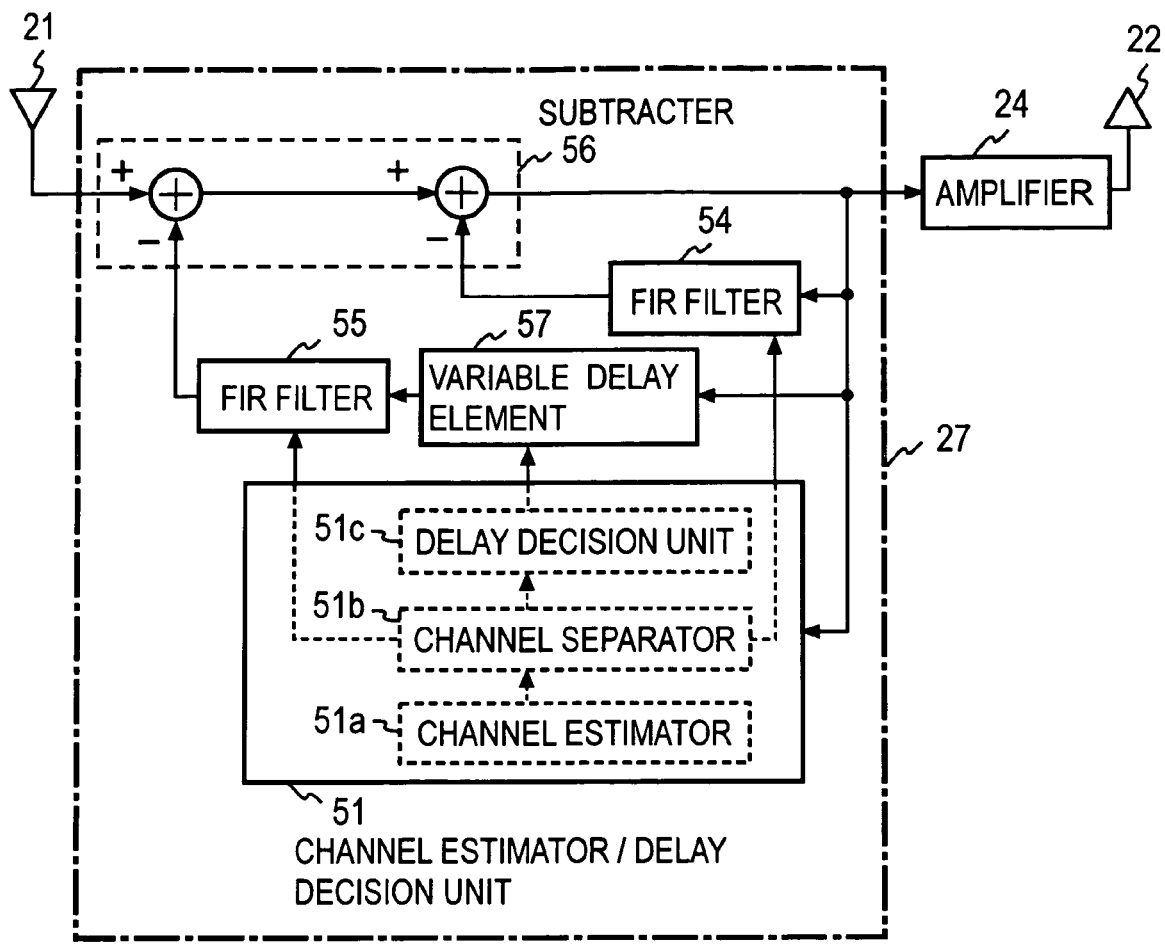
FIG. 14 shows a functional arrangement of another embodiment of a radio repeater according to the present invention.
Figure 15:
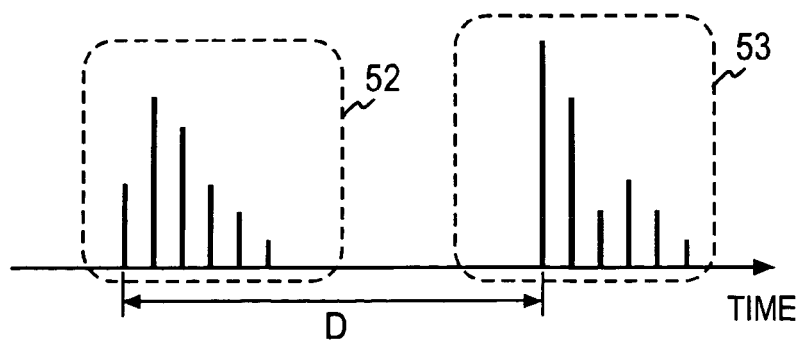
FIG. 15 is a diagram of examples of the impulse response of a transmission path for a loop interference signal detected by a channel estimator 5 1a shown in FIG. 14.

The embodiment 3 is shown in FIG. 14 where a received signal from a first-polarization reception antenna 21 is passed through a loop interference suppressor 27 before it is input to an amplifier 24, and the amplified radio signal from the amplifier 24 is transmitted from a second-polarization transmission antenna 22. In the loop interference suppressor 27, the received signal from the reception antenna 21 is input to a channel estimation/delay decision unit 51 including a channel estimator 51a where the transmission characteristic of the loop interference signal is estimated according to a technique as disclosed in the literature 1, for example. The estimated transmission characteristic represents an impulse response of the loop interference signal, for example, and as shown in FIG. 15, it provides an impulse response 52 for a transmission path of a loop interference signal which results from a reflected wave without passing through a different radio repeater and an impulse response 53 for a transmission path of a loop interference signal which passes through a different radio repeater in delayed relationship with respect the impulse response 52.

The unit also includes a channel separator 51b where the initial impulse response 52 and the later impulse response 53 are separated. The separation takes place, for example, by detecting a value of the impulse response which is in excess of a given value and which appears after the value of the initial impulse response 52 has reduced below a given value. The separated initial impulse response 52 or an estimate of the transmission path characteristic of a loop interference signal which does not involve a radio repeater is set up in an FIR filter 54 while the impulse response 53 which is obtained later or the transmission path characteristic of a loop interference signal which passes through a radio repeater is set up in an FIR filter 55. A delay decision unit 51c detects a time interval D from the beginning of the initial impulse response 52 to the beginning of the later impulse response 53, and this time interval is set up as a delay time in a variable delay element 57.

The received radio signal from the reception antenna 21, which is an input signal to the amplifier 24, is convoluted with the initial impulse response 52 in the FIR filter 54 to produce a replica of the loop interference signal which does not involve a radio repeater. The replica of the loop interference signal is subtracted from the received radio signal in a subtractor 56. The input signal to the amplifier 24 is delayed by the time interval D in the variable delay element 57 before it is input to the FIR filter 55. The delayed input signal is convoluted with the later impulse response 53 in the FIR filter 55 to produce a replica of the loop interference signal which involves a radio repeater. This replica of the loop interference signal is subtracted from the received radio signal in the subtractor 56. The received radio signal from which replicas of the both loop interference signals are subtracted in the subtractor 56 is then input to the amplifier 24.

The time difference D between the impulse response 52 and the impulse response 53 coincides with a time difference between a loop interference signal which does not involve a radio repeater and a loop interference signal which involves a radio repeater. Accordingly, the received radio signal is input to the amplifier 24 in a form in which the both loop interference signals have been suppressed. It will be seen that the both FIR filters 54 and 55 are only required to have a number of taps which corresponds to the length of the respective impulse responses 52 and 53. However, in an FIR filter of a conventional loop interference suppressor, the filter is required to have a number of taps corresponding to a time interval from the beginning of the initial impulse response 52 to the end of the later impulse response 53. It will be seen that a sum of the numbers of taps in the FIR filters 54 and 55 in the embodiment 3 is greatly reduced in comparison to the number of taps required in the conventional arrangement. The estimation of the transmission path characteristic of a loop interference signal is conducted periodically in a suitable manner, and coefficients of a corresponding FIR filter are set up in accordance with the estimated transmission path characteristic (impulse response coefficeints) in each of the loop interference suppressor 27 as well as the loop interference suppressors $27_1$ and $27_2$ of the radio repeaters shown in FIG. 7.

EMBODIMENT 4

The radio repeater shown in FIG. 14 represents an application of the present invention to the radio repeater $20_1$ shown in FIG. 12, for example, but is also applicable to the radio repeater 20 shown in FIG. 11 or to the radio repeater $20_1$ or $20_2$ shown in FIG. 13. Such an example is illustrated in FIG. 16 where corresponding parts are designated by like reference numerals as in FIG. 14 in order to omit a duplicate description, with each reference numeral being attached with a suffix "$_1$" for a relay system from the reception antenna $21_1$ to the transmission antenna $22_1$ and with a suffix "$_2$" for a relay system from the reception antenna $21_2$ to the transmission antenna $22_2$.

EMBODIMENT 5

Figure 7:
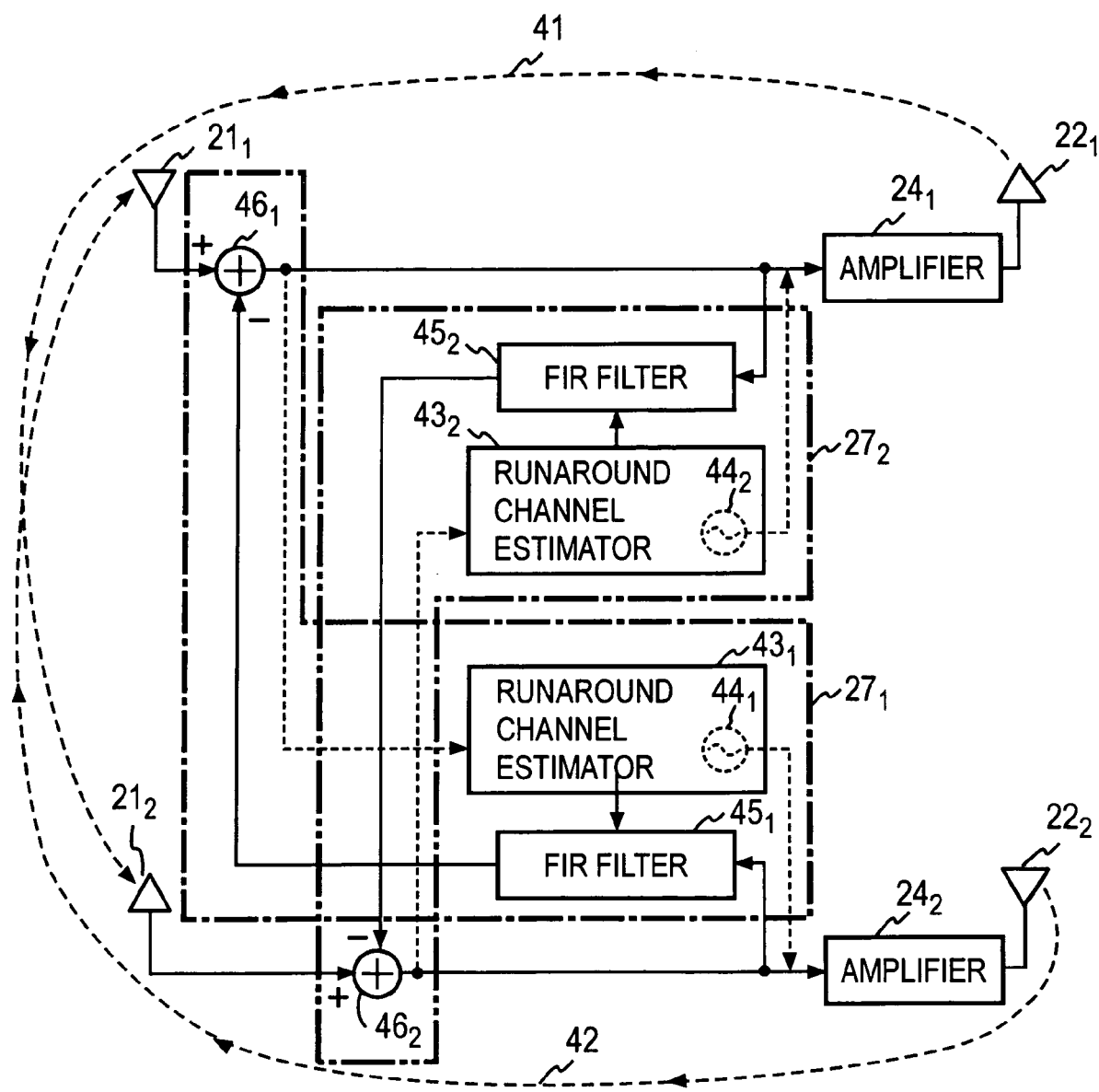
FIG. 7 shows a functional arrangement of a specific example of loop interference suppressors $27_1$ and $27_2$ in the radio repeater shown in FIG. 6.
Figure 16:
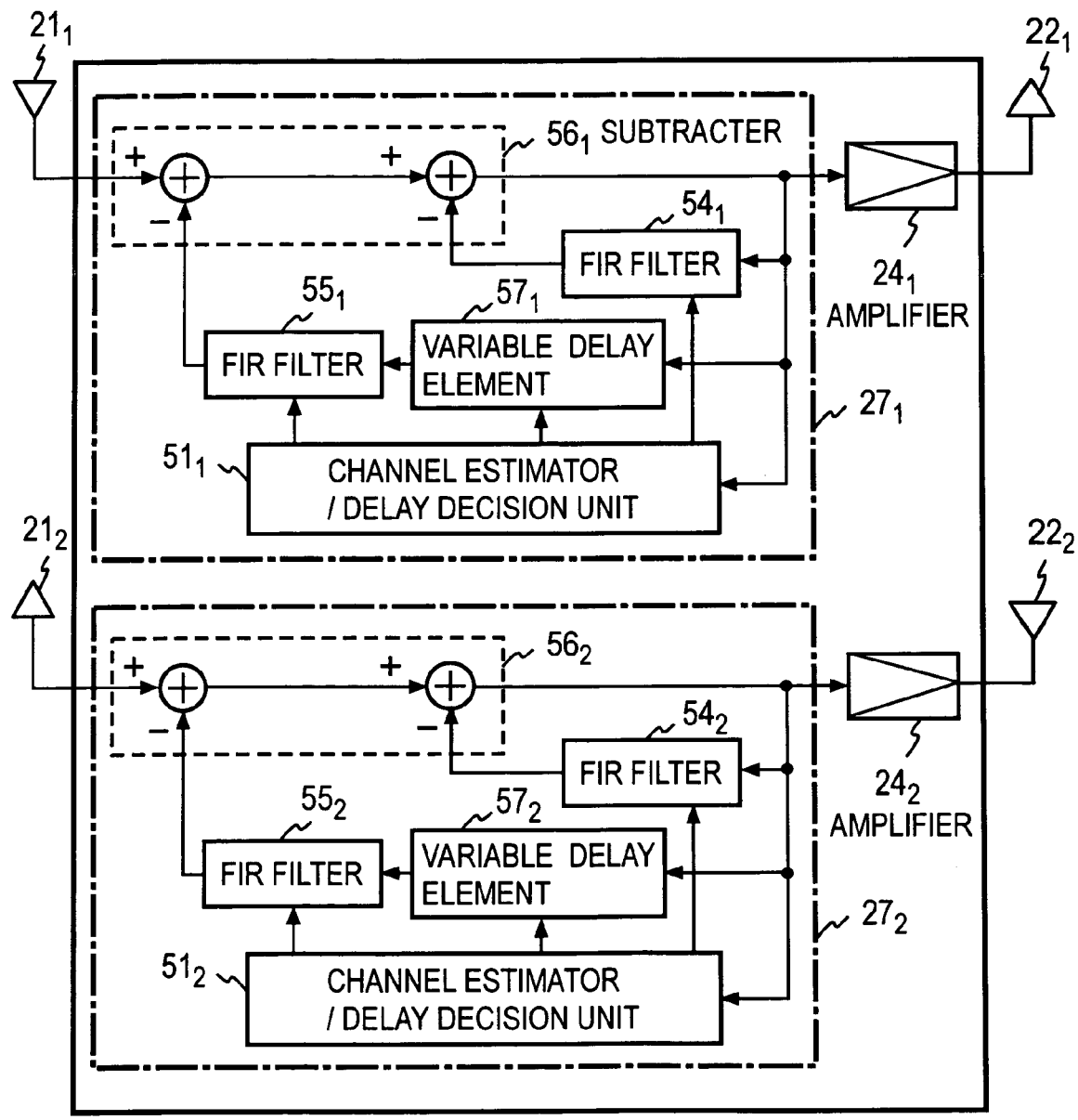
FIG. 16 shows a functional arrangement of an example in which an interference suppressor shown in FIG. 14 is applied to a radio repeater including two amplifying and relaying systems.
Figure 17:
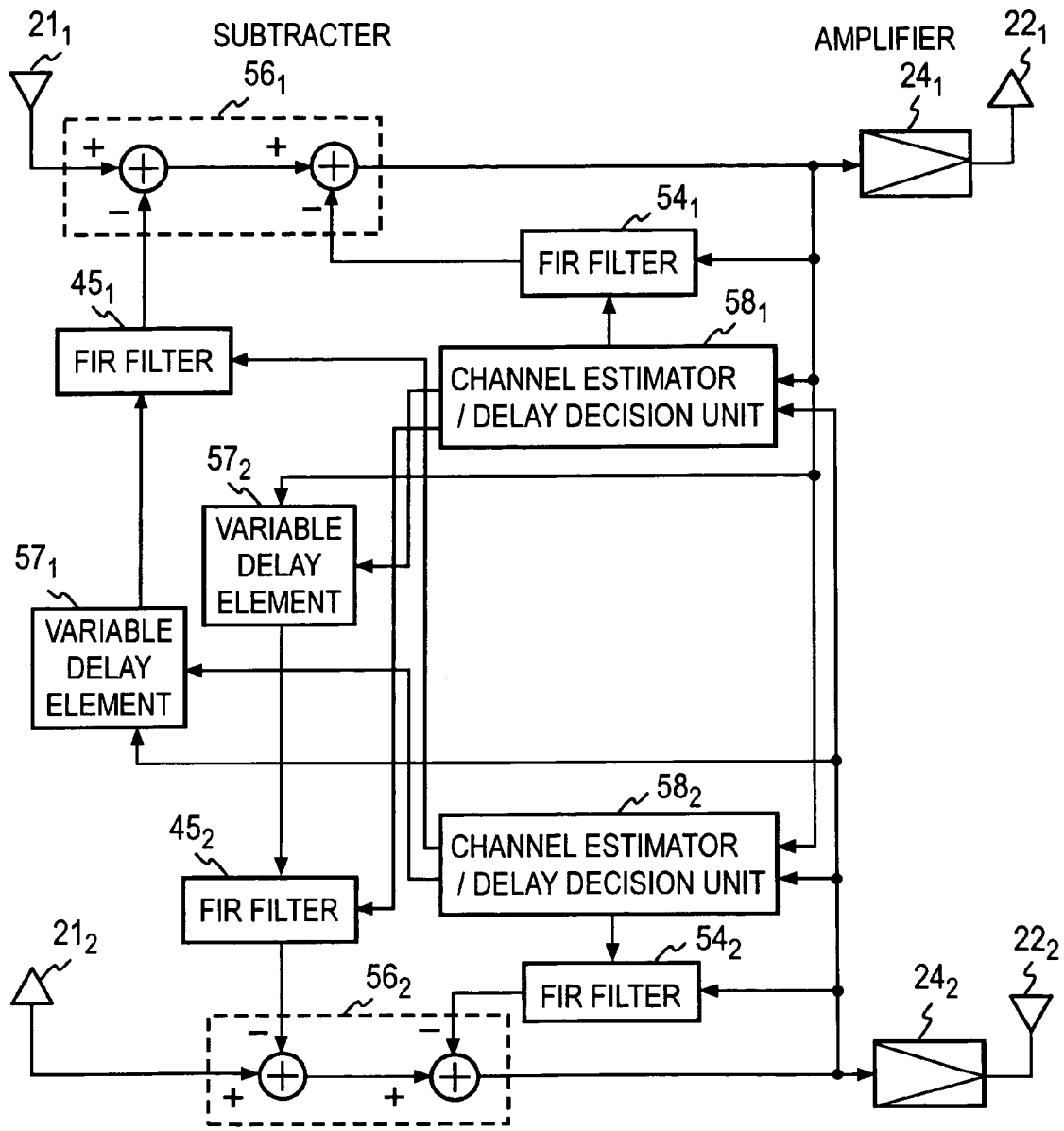
FIG. 17 shows a functional arrangement of an example in which the suppression illustrated in FIG. 7 and the suppression illustrated in FIG. 14 are applied to a radio repeater including two amplifying and relaying systems.

In the arrangement of FIG. 16, a loop interference signal in an own relay system or a loop interference signal resulting from a signal transmitted from a transmission antenna $22_1$ and which is received by a reception antenna $21_1$ is suppressed, and a loop interference signal in an own relay system from a transmission antenna $22_2$ to a reception antenna $21_2$ is suppressed. Referring to FIG. 17, an embodiment 5 will now be described where a signal from a transmission antenna $22_1$ running around to a reception antenna $21_1$ (own relay system) by reflection or the like as well as a signal which runs around to a reception antenna $21_2$ (different relay system) as shown in FIG. 7 are both suppressed. Part of each output signal from subtractors $56_1$ and $56_2$ are input to a channel estimator/delay decision unit $58_1$ in order to estimate the characteristic of a loop interference transmission path to the reception antenna $21_1$ (own relay system) which occurs as a result of a change of the polarization characteristic as by reflection and to estimate the characteristic of a loop interference transmission path to a reception antenna $21_2$ (different relay system) (or a loop interference transmission path 41 shown in FIG. 7). The estimated former loop interference path characteristic is set up in an FIR filter $54_1$ while the estimated latter loop interference transmission path characteristic is set up in an FIR filter $45_2$, and the delay which is determined is set up in the variable delay element $57_2$. Part of an input signal to an amplifier $24_1$ is input to the FIR filter $45_2$ through the variable delay element $57_2$, an output of which is input to the subtractor $56_2$.

In a similar manner, part of output signals from each of subtractors $56_1$ and $56_2$ is input to a channel estimator/delay decision unit $58_2$ in order to estimate the characteristic of a loop interference transmission path by which a transmission from a transmission antenna $22_2$ is received by a reception antenna $21_2$ (own relay system) by reflection and to estimate the characteristic of a loop interference transmission path by which the same transmission is received by the reception antenna $21_1$ (different relay system). The estimated former loop interference transmission path characteristic is set up in an FIR filter $54_2$, the estimated latter loop interference transmission path characteristic is set up in an FIR filter $45_1$, and the delay which is determined is set up in a variable delay element $57_1$.

Part of the input signal to an amplifier $24_2$ is input to the FIR filter $45_1$ through the variable delay element $57_1$, and an output form the FIR filter $45_1$ is input to the subtractor $56_1$. In order to prevent an oscillation from occurring, an output signal from the subtractor $56_1$ is not input to the amplifier $24_1$ during the time a pilot signal is being transmitted.

Figure 18:
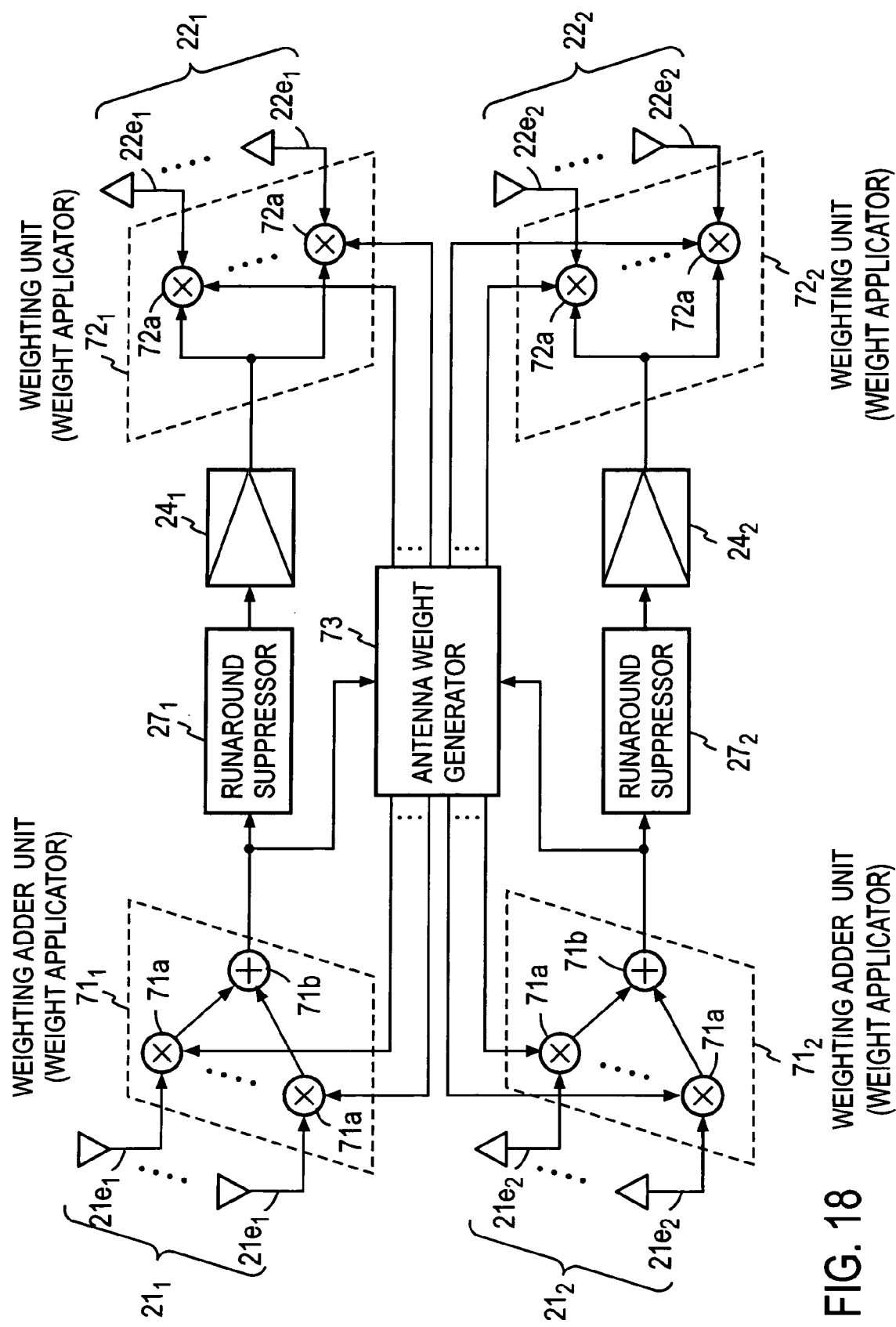
FIG. 18 shows a functional arrangement of an embodiment of a radio repeater according to the present invention which uses array antennas.

In the radio repeaters shown in the embodiments 1, 4 and 5, in the system examples 1 and 2 and in the radio repeater described in the embodiment 3, each antenna has been shown as a single antenna element. However, each antenna may comprise an array antenna. Such an embodiment 5 is shown in FIG. 18.

An array antenna comprising a plurality of first-polarization antenna elements $21e_1$ is formed for a first-polarization reception antenna $21_1$, a reception array antenna comprising a plurality of second-polarization antenna elements $21e_2$ is formed for a second-polarization reception antenna $21_2$, an array antenna comprising a plurality of second-polarization antenna elements $22e_1$ is formed for a second-polarization transmission antenna $22_1$, and an array antenna comprising a plurality of first-polarization antenna elements $22e_2$ is formed for a first-polarization transmission antenna $22_2$.

Radio signals received by respective first-polarization antenna elements $22e_1$ of the first-polarization reception antenna $21_1$ are weighted according to their amplitudes an phases in multipliers $71a$ located within a weighting adder $71_1$ and are then added together in an adder $71b$ to be input to a loop interference suppressor $27_1$. Similarly, radio signals received by respective second-polarization antenna elements $21e_2$ of the second-polarization reception antenna $21_2$ are weighted and added together in a weighting adder $71_2$ to be input to a loop interference suppressor $27_2$.

An amplified output signal from the adder $24_1$ is branched into a plurality of portions in a weighting unit $72_1$ to be weighted according to their amplitudes and phases in respective multipliers $72a$ to be fed subsequently to corresponding second-polarization antenna elements $22e_1$ of the second-polarization transmission antenna $22_1$ for transmission as radio waves. Similarly, an amplified output signal from the amplifier $24_2$ is branched and weighed in a weighting unit $72_2$ to be fed to corresponding first-polarization antenna elements $22e_2$ for transmission as radio waves.

An antenna weight generator 73 generates weights which are set up in respective multipliers $71a$ in the weighting adders $71_1$ and $71_2$, thus controlling the antenna directivity patterns of the first-polarization reception antenna $21_1$ and the second-polarization reception antenna $21_2$ so as to reduce the magnitude of the loop interference signals which are received by the first-polarization reception antenna $21_1$ and the second-polarization reception antenna $21_2$. Similarly, the antenna weight generator 73 generates weights which are set up in the respective multipliers in the weighting unit $72_1$ and $72_2$, controlling the antenna directivity patterns of the second and the first-polarization transmission antenna $22_1$ and $22_2$ so as to reduce the magnitude of loop interference signals which are received by the first and the second-polarization reception antenna $21_1$ and $21_2$.

The weights which are used in the weighting adders $71_1$ and $71_2$ and the weighting units $72_1$ and $72_2$ may be calculated so as to allow the directivity patterns of each array antenna to be adjusted to act suppressing respective loop interference signals during the manufacture of the radio repeater, and the weights may be fixed as adjusted. Alternatively, during the operation of the radio repeater, the weights may be corrected in accordance with the surrounding environment periodically, for example, when the reception of the radio signals by the first and the second-polarization reception antenna $21_1$ and $21_2$ is momentarily interrupted, by transmitting a monitor signal from the second and the first-polarization transmission antenna $22_1$ and $22_2$ and correcting the weights so as to reduce the magnitude of loop interference signals which are received by the first and the second-polarization antenna $21_1$ and $21_2$. It will be seen that the weighting adders $71_1$ and $71_2$ and the weighting units $72_1$ and $72_2$ form weight applicators which establish weights to the respective antenna elements of the corresponding array antennas.

Specifically, the weights used in the weighting adders $71_1$ and $71_2$ are established so that in the antenna directivity patterns of at least the first and the second-polarization reception antenna $21_1$ and $21_2$, the gain in the oncoming directions of radio signals which are intended to be received is greater than the gain in the direction of incidence of loop interference signals. Similarly, the weights used in the weight applicators $72_1$ and $72_2$ are established so that in the antenna directivity patterns of at least the second and the first-polarization transmission antenna $22_1$ and $22_2$, the gain in the direction of transmission is greater than the gain in the oncoming direction of radio signals which the first and the second-polarization reception antenna $21_1$ and $21_2$ are intended to receive.

With this arrangement, it is possible by a control of the directivity in the first-polarization reception array antenna $21_1$ to reduce the influence of loop interference signals from the first-polarization transmission array antenna $22_2$ which has the same polarization and the influence of loop interferences from the second-polarization transmission array antenna $22_1$ due to an imperfectness of the separation based on the orthogonality of the polarizations. Similarly, it is possible by a control of the directivity in the second-polarization reception array antenna $21_2$ to reduce the influence of loop interference signals from the second-polarization transmission array antenna $22_1$ which has the same polarization as the array antenna $21_2$ and the influence of loop interferences from the first-polarization transmission array antenna $22_2$ due to an imperfectness of the separation based on the orthogonality of the polarizations. It is also possible by a control of the directivity in the second-polarization transmission array antenna $22_1$ to reduce a influence of a loop interference signals to the second-polarization reception array antenna $21_2$ which has the same polarization as the array antenna $22_1$ and the influence of loop interferences to the first-polarization reception array antenna $21_1$ due to an imperfectness of the separation based on the orthogonality of the polarizations. In the similar manner, it is possible by a control of the directivity in the first-polarization transmission array antenna $22_2$ to reduce the influence of loop interference signals to the first-polarization reception array antenna $22_1$ which has the same polarization as the array antenna $22_2$ and the influence of loop interferences to the second-polarization reception array antenna $21_2$ due to an imperfectness of the separation based on the orthogonality of the polarizations.

As described above, since the influences of the loop interference signals are reduced by utilizing the directivity of the array antennas and the loop interference suppressors in the embodiment 5, the occurrence of an oscilation caused by loop interference signals can be suppressed while allowing the gain of the amplifiers to be increased. The array antenna may be used for only the reception antennas $21_1$ and $21_2$ or only for the transmission antennas $22_1$ and $22_2$.

It will be seen that each radio repeater 20 shown in FIGS. 8 to 13 have a very simple arrangement, and thus can be manufactured in a compact form and inexpensively. Accordingly, the radio repeater 20 can be used in the mobile communication system or broadcasting system by installing it at a location such as on a building where an external radio wave can be relatively readily received and where the relayed radio wave can be propagated into the inside of the building or by installing it within a car body of a taxi, a home deliverly vehicle or an omnibus which is either occupied or densely populated to provide a relay service region of a restricted area in a simple manner. If the radio repeater 20 is installed on a moving vehicle and such radio repeater 20 utilizes circular polarization as shown in FIG. 4, the orhtogonality of the polarizations can be maintained between a radio signal received by the reception antenna 21 and the radio signal transmitted from the transmission antenna 22 if the planes 41 and 43 shown in FIG. 4 are parallel to a corresponding plane of the transmission antenna of the transmitter 10, but if the planes 41 and 43 are perpendicular to a corresponding plane of the transmission antenna of the transmitter 10, the radio signal received by the reception antenna 21 and the radio signal transmitted from the transmission antenna 22 will have an identical vertical polarization. Similarly, if a radio repeater which utilizes the circular polarization shown in FIG. 5 is used, when the antenna of the radio repeater and the transmission antenna of the transmitter 10 are disposed exactly in opposing relationship, the radio signal received by the reception antenna 21 and the radio signal transmitted from the transmission antenna 22 have circular polarizations which rotate in mutually opposite directions, but when the antenna of the radio repeater and the transmission antenna of the transmitter are disposed in planes which are perpendicular to each other, a radio signal received by the reception antenna 21 of the radio repeater and a radio signal transmitted from the transmission antenna 22 both have a vertical polarization, and the orhtogonality between the polarizations can no longer be maintained. In any of these instances, the provision of the loop interference suppressors allows a relay amplification to be made without losing an advantages of an increased number of propagation paths which results from the use of the radio repeater.

It will be understood from the foregoing description that the transmission characteristic of the loop interference signal which is estimated by the loop interference suppressor of the radio repeater is either one of (1) a transmission path characteristic of a radio signal transmitted from a second-polarization transmission antenna $22_1$, for example, until it is received by a first-polarization reception antenna $21_1$ due to a change of the polarization of the transmitted radio signal as by reflection, (2) a transmission path characteristic until the same transmitted signal is received by a second-polarization reception antenna $21_2$ and (3) a transmission path characteristic of the same transmitted radio signal after it is received by the second-polarization reception antenna $21_2$, amplified by the amplifier 14 and transmitted from a first-polarization transmission antenna $22_2$ until it is received by the first-polarization reception antenna $21_1$, or two combinations of (1) and (2) or (3).

What is claimed is:

1. A radio repeater, comprising:
   at least first and second relay systems, each including
      a reception antenna configured to receive a radio signal;
      a loop interference suppressor, connected to the reception antenna, configured to suppress a loop interference signal in the received radio signal from said reception antenna;
      an amplifier configured to amplify the loop interference-suppressed radio signal from the loop interference suppressor; and
      a transmission antenna having a polarization characteristic, which is orthogonal to a polarization characteristic of said reception antenna, configured to transmit an output of said amplifier,
   wherein the polarization characteristics of the reception antennas of said first and second relay systems are orthogonal to each other, the polarization characteristics of the transmission antennas of said first and second relay systems are orthogonal to each other, and the loop interference suppressor in each one of said first and second relay systems is configured to produce a suppression signal from the radio signal to be transmitted from the other one of said first and second relay systems and to suppress the loop interference signal in the received radio signal from the reception antenna of said one of the first and second relay systems.

2. A radio repeater according to claim 1, wherein the loop interference suppressor in each one of the first and second relay systems comprises:
   a channel estimator configured to receive the radio signal to be transmitted from the transmission antenna of a corresponding one of the first and second relay systems as an input for estimating a first transmission path characteristic of the loop interference signal which comes from the transmission antenna of the other one of the first and second relay systems to the reception antenna of the corresponding relay system;
   a finite impulse response filter (FIR) configured to convolute the estimated first transmission path characteristic with the radio signal to be transmitted by the transmission antenna of the other relay system to produce a replica as the suppression signal; and
   a subtractor configured to subtract the replica from the FIR filter from the radio signal received by the reception antenna of the corresponding relay system to feed it to the amplifier of the corresponding relay system.

3. A radio repeater according to claim 2, wherein the radio signal received by the reception antenna of the other relay system is also input to the channel estimator that is configured to estimate a second transmission path characteristic of the loop interference signal which comes from the transmission antenna of the corresponding relay system to the reception antenna of the corresponding relay system,
   the channel estimator comprising a variable delay means for causing the radio signal received by the reception antenna of the corresponding relay system to be delayed by an amount corresponding to a detected delay, and a second FIR filter configured to convolute the second transmission path characteristic with the received and delayed radio signal,
   the subtractor configured to subtract each output signal from the second FIR filter from the radio signal received by the reception antenna of the corresponding relay system.

4. A radio repeater according to claim 1, wherein the loop interference suppressor in each of said first and second relay systems comprises:

a channel estimator configured to estimate a transmission path characteristic of the loop interference signal received by the reception antenna which is connected to the loop interference suppressor;

a channel separator configured to discriminate and to separate a first transmission path characteristic contained in the estimated transmission path characteristic from a delayed second transmission path characteristic;

a delay decision unit configured to detect the delay of the second transmission path characteristic with respect to the first transmission path characteristic;

a first finite impulse filter (FIR) configured to convolute FIR filter for convoluting the radio signal received by the reception antenna which is connected to the loop interference suppressor with the first transmission path characteristic;

a variable delay means for delaying the radio signal received by the reception antenna which is connected to the loop interference suppressor by the detected delay;

a second FIR filter configured to convolute the received and delayed radio signal with the second transmission path characteristic; and a subtractor configured to subtract each output signal from the first FIR filter and the second FIR filter from the radio signal received by the reception antenna which is connected to the loop interference suppressor to feed the amplifier.

5. A radio repeater according to one of claims 1 to 4, wherein at least one of the reception antennas of the first and second relay systems and at least one of the transmission antennas of said first and second relay systems each comprises an array antenna including a plurality of antenna elements, further comprising:

a weight applicator configured to establish weights to each antenna element of the array antenna in order to determine a directivity which suppresses the loop interference signal.

6. A radio relay transmission method, comprising:

transmitting radio signals from a transmitter using at least one of first antennas having a first-polarization characteristic and at least one of second antennas having a second-polarization characteristic which is orthogonalized to the first-polarization characteristic;

at a radio repeater having first and second relay systems, each including a reception antenna and a transmission antenna.

receiving the transmitted radio signals by the reception antenna of the first relay system having the first polarization characteristic and by the reception antenna of the second relay system having the second-polarization characteristic;

producing suppression signals each from a radio signal to be transmitted from the transmission antenna of a corresponding one of said first and second relay systems and suppressing a loop interference signal received by the reception antenna of the other one of said first and second relay systems with the suppression signal; and amplifying the loop-interference-suppressed received radio signal signals in said first and second relay systems and transmitting them from the transmission antennas of said first and second relay systems having the second and first polarization characteristics, respectively, for radio relaying.

7. A radio relay transmission method according to claim 6, further comprising:

receiving the radio relayed radio signals by at least one of the antennas having the first-polarization characteristic and at least one of the antennas having the second-polarization characteristic in a receiver.

* * * * *